(12) United States Patent
Lin et al.

(10) Patent No.: US 9,268,634 B2
(45) Date of Patent: Feb. 23, 2016

(54) DECODING METHOD, MEMORY STORAGE DEVICE AND MEMORY CONTROLLING CIRCUIT UNIT

(71) Applicant: PHISON ELECTRONICS CORP., Miaoli (TW)

(72) Inventors: Wei Lin, Taipei (TW); Shao-Wei Yen, Kaohsiung (TW); Yu-Hsiang Lin, Yunlin County (TW); Kuo-Hsin Lai, Hsinchu County (TW); Kuo-Yi Cheng, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 169 days.

(21) Appl. No.: 14/109,959

(22) Filed: Dec. 18, 2013

(65) Prior Publication Data

US 2015/0095741 A1    Apr. 2, 2015

(30) Foreign Application Priority Data

Sep. 30, 2013 (TW) .............................. 102135387 A

(51) Int. Cl.
*G06F 11/00* (2006.01)
*G06F 11/10* (2006.01)

(52) U.S. Cl.
CPC ........ *G06F 11/1008* (2013.01); *G06F 11/1048* (2013.01)

(58) Field of Classification Search
CPC .................................................. G06F 11/1008
See application file for complete search history.

(56) References Cited

U.S. PATENT DOCUMENTS

2008/0244338 A1* 10/2008 Mokhlesi et al. ............. 714/702

FOREIGN PATENT DOCUMENTS

TW    200905692    2/2009

OTHER PUBLICATIONS

"Office Action of Taiwan Counterpart Application", issued on May 22, 2015, p. 1-p. 7, in which the listed reference was cited.

* cited by examiner

*Primary Examiner* — Sam Rizk
(74) *Attorney, Agent, or Firm* — Jianq Chyun IP Office

(57) ABSTRACT

A decoding method, a memory storage device and a memory controlling circuit unit are provided. The method includes: reading memory cells according to a first reading voltage to obtain first verifying bits; executing a decoding procedure including a probability decoding algorithm according to the first verifying bits to obtain first decoded bits, and determining whether a decoding is successful by using the decoded bits; if the decoding is failed, reading the memory cells according to a second reading voltage to obtain second verifying bits, and executing the decoding procedure according to the second verifying bits to obtain second decoded bits. The second reading voltage is different from the first reading voltage, and the number of the second reading voltage is equal to the number of the first reading voltage. Accordingly, the ability for correcting errors is improved.

30 Claims, 16 Drawing Sheets

DECODING METHOD, MEMORY STORAGE DEVICE AND MEMORY CONTROLLING CIRCUIT UNIT

CROSS-REFERENCE TO RELATED APPLICATION

This application claims the priority benefit of Taiwan application serial no. 102135387, filed on Sep. 30, 2013. The entirety of the above-mentioned patent application is hereby incorporated by reference herein and made a part of this specification.

BACKGROUND

1. Technology Field

The invention relates to a decoding method, and more particularly, to a decoding method regarding a rewritable non-volatile memory module, a memory storage device and a memory controlling circuit unit using the same.

2. Description of Related Art

The markets of digital cameras, cellular phones, and MP3 players have expanded rapidly in recent years, resulting in escalated demand for storage media by consumers. The characteristics of data non-volatility, low power consumption, and compact size make the rewritable non-volatile memory module (e.g., flash memory) ideal for being built in the portable multi-media devices as cited above.

Generally, some error correcting codes (ECC) are added in data which are stored in the rewritable non-volatile memory module. In the past, the error correcting codes use more of algebraic decoding algorithms, such as (BCH code). However, probability decoding algorithms, such as low density parity code (LDPC), are gradually mature recently. The low density parity code is to use a sparse matrix to perform encoding and decoding. A null space of the sparse matrix contains all valid codewords. The number of correctable bits increases when the range between the valid codewords increases. However, the range between the valid codewords is not fixed, and so the number of correctable bits is not fixed. For example, when there are errors occurred to four bits in a codeword, the corresponding low density parity code can correct these errors; however, when there are errors occurred to other three bits in the same codeword, the corresponding low density parity code may not correct these errors. Furthermore, the capability of error correction of the low density parity code is not the same when different sparse matrices are used.

FIG. 1 is an error rate curve of the low density parity code.

Referring to FIG. 1, the horizontal axis represents a raw bit error rate (RBER), which refers to the error rate before data decoding; the vertical axis represents an uncorrectable bit error rate (UBER), which refers to the error rate after data decoding. Curve 180 represents the first matrix, and curve 190 represents the second matrix. The first matrix and the second matrix have the same size, that is, the codewords generated with these two matrices have the same code rate. However, elements in the first matrix and the second matrix are not the same. The curve 180 has a lower UBER within an error floor region, but the curve 190 has a lower UBER within a waterfall region. In other words, there exists a trade-off between the curve 180 and the curve 190. Accordingly, how to improve the capability of error correction under the condition of the same code rate is one of the major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a decoding method, a memory storage device and a memory controlling circuit unit using the same, capable of improving the capability of error correction.

A decoding method is provided according to an exemplary embodiment of the invention, which is used in a rewritable non-volatile memory module including a plurality of memory cells. The decoding method includes: reading a plurality of first memory cells according to at least one first reading voltage to obtain at least one first verifying bit of each of the first memory cells; executing a first decoding procedure including a probability decoding algorithm according to the first verifying bits to obtain a plurality of first decoded bits, and determining whether a decoding is successful by using the first decoded bits; and if the decoding is failed, reading the first memory cells according to at least one second reading voltage to obtain at least one second verifying bit of each of the first memory cells, and executing the first decoding procedure according to the second verifying bits to obtain a plurality of second decoded bits, wherein the second reading voltage is different from the first reading voltage, and the number of the second reading voltage is equal to the number of the first reading voltage.

A memory storage device is provided according to an exemplary embodiment of the invention, which includes a connection interface unit, a rewritable non-volatile memory module, and a memory controlling circuit unit. The connection interface unit is configured to couple to a host system. The memory controlling circuit unit is coupled to the connection interface unit and the rewritable non-volatile memory module, and is configured to read a plurality of first memory cells according to at least one first reading voltage to obtain at least one first verifying bit of each of the first memory cells. The memory controlling circuit unit is configured to execute a first decoding procedure including a probability decoding algorithm according to the first verifying bits to obtain a plurality of first decoded bits, and determining whether a decoding is successful by using the first decoded bits. If the decoding is failed, the memory controlling circuit unit is configured to read the first memory cells according to at least one second reading voltage to obtain at least one second verifying bit of each of the first memory cells, and to execute the first decoding procedure according to the second verifying bits to obtain a plurality of second decoded bits, wherein the second reading voltage is different from the first reading voltage, and the number of the second reading voltage is equal to the number of the first reading voltage.

A memory controlling circuit unit for controlling a rewritable non-volatile memory module is provided according to an exemplary embodiment of the invention. The memory controlling circuit unit includes: a host interface, a memory interface, an error checking and correction circuit, and a memory management circuit. The host interface is configured to couple to a host system. The memory interface is configured to couple to the rewritable non-volatile memory module. The memory management circuit is coupled to the host interface and the memory interface, and is configured to read a plurality of first memory cells of the memory cells according to at least one first reading voltage to obtain at least one first verifying bit of each of the first memory cells. The error checking and correction circuit executes a first decoding procedure comprising a probability decoding algorithm according to the first verifying bits to obtain a plurality of first decoded bits, and determine whether a decoding is successful by using the first decoded bits. If the decoding is failed, the memory management circuit is configured to read the first memory cells according to at least one second reading voltage to obtain at least one second verifying bit of each of the first memory cells, and the error checking and correction circuit is configured to execute the first decoding procedure according to the second verifying bits to obtain a plurality of second decoded bits, wherein the second reading voltage is different from the first reading voltage, and the number of the second reading voltage is equal to the number of the first reading voltage.

Based on the above, the decoding method, the memory storage device and the memory controlling circuit unit provided in the exemplary embodiment of the invention are capable of re-obtaining the reading voltages or resetting the sign reading voltages or both, and further re-decoding. Thereby, the capability of error correction is improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the disclosure more comprehensible, several embodiments accompanied with drawings are described in detail as follows.

DESCRIPTION OF THE EMBODIMENTS

Figure 1:
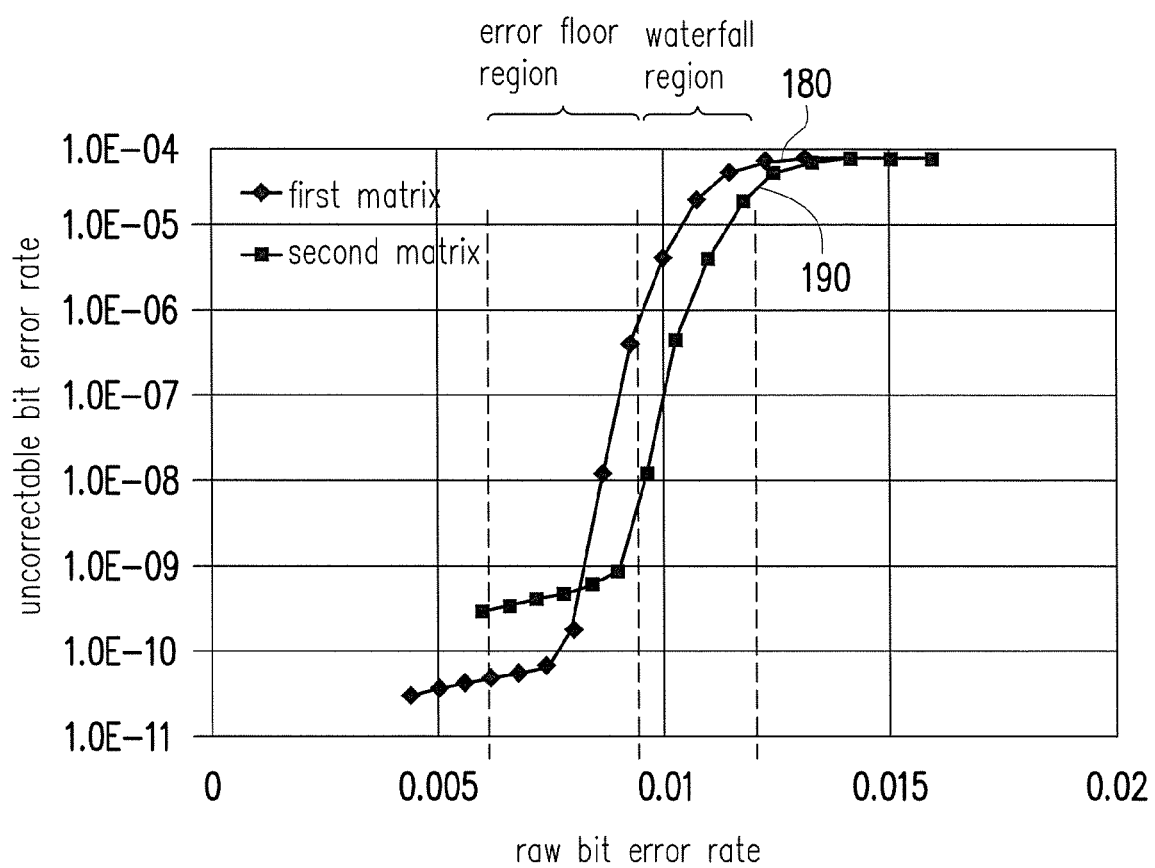
FIG. 1 is an error rate curve of the low density parity code.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 2:
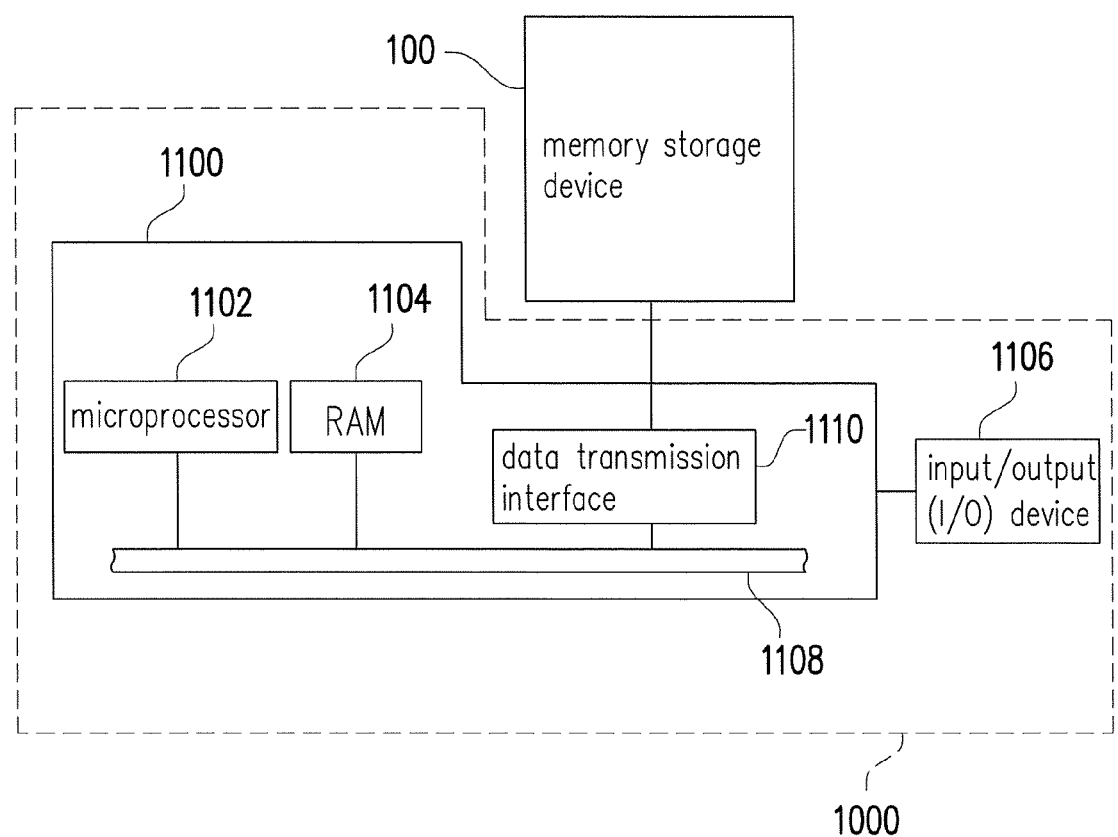
FIG. 2 illustrates a host system and a memory storage device according to an exemplary embodiment.
Figure 3:
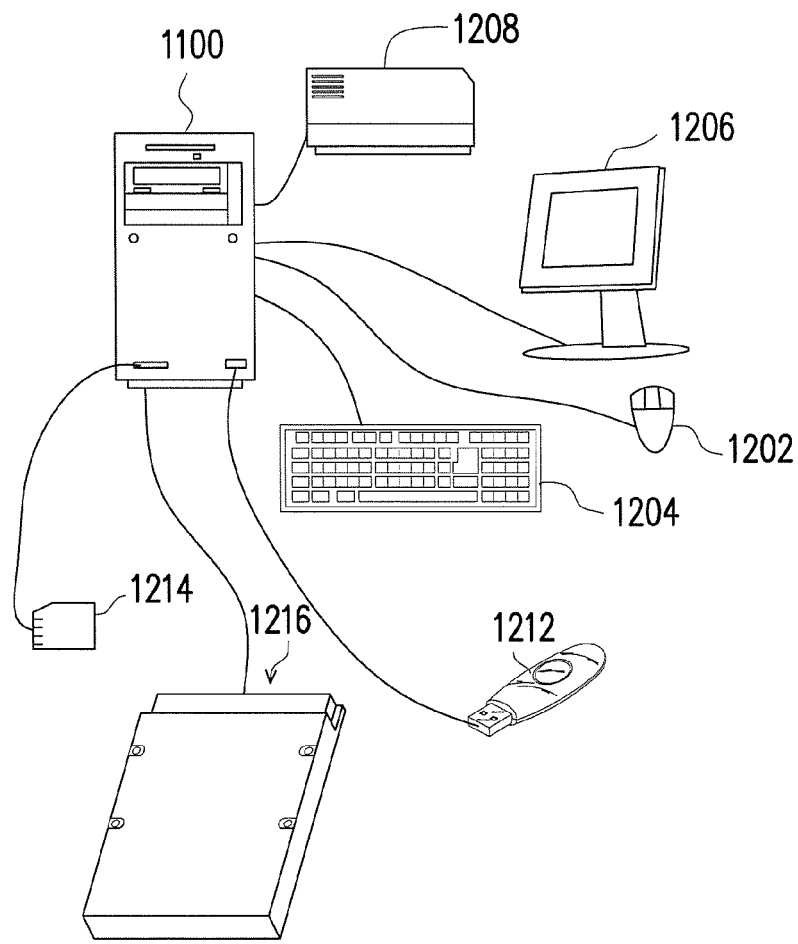
FIG. 3 is a schematic diagram illustrating a computer, an input/output device, and a memory storage device according to an exemplary embodiment.

FIG. 2 illustrates a host system and a memory storage device according to an exemplary embodiment. FIG. 3 is a schematic diagram illustrating a computer, an input/output device, and a memory storage device according to an exemplary embodiment.

Referring to FIG. 2, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 3. It should be understood that the devices illustrated in FIG. 3 are not intended to limit the I/O device 1106, and the I/O device 1106 may further include other devices.

In the embodiment of the invention, the memory storage device 100 is coupled to the devices of the host system 1000 through the data transmission interface 1110. By using the microprocessor 1102, the random access memory (RAM) 1104 and the Input/Output (I/O) device 1106, data may be written to the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 3.

Figure 4:
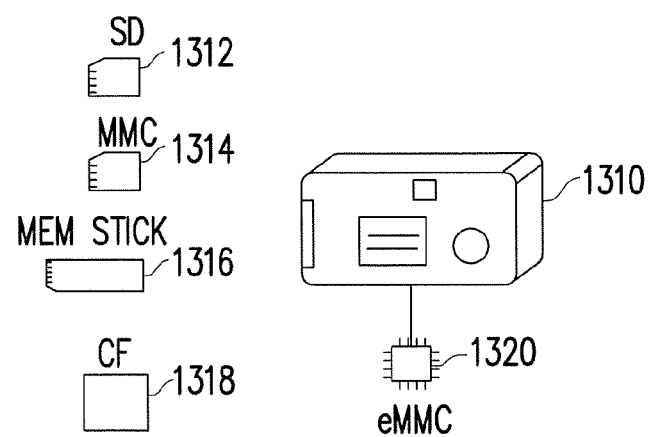
FIG. 4 is a schematic diagram illustrating a host system and a memory storage device according to an exemplary embodiment.

FIG. 4 is a schematic diagram illustrating a host system and a memory storage device according to an exemplary embodiment.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 4). The embedded storage device 1320 includes an embedded MMC (eMMC). It should be mentioned that the eMMC is directly coupled to a substrate of the host system.

Figure 5:
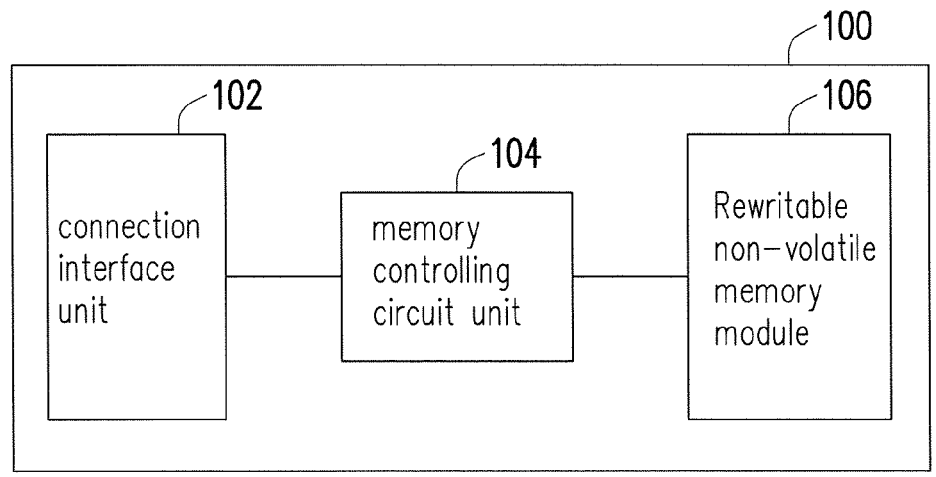
FIG. 5 is a schematic block diagram illustrating the memory storage device according to the first exemplary embodiment.

FIG. 5 is a schematic block diagram illustrating the memory storage device depicted in FIG. 2.

Referring to FIG. 5, the memory storage device 100 includes a connection interface unit 102, a memory controlling circuit unit 104 and a rewritable non-volatile memory module 106.

In the present exemplary embodiment, the connection interface unit 102 is compatible with a serial advanced technology attachment (SATA) standard. However, the invention is not limited thereto, and the connection interface unit 102 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 102 and the memory controlling circuit unit 104 can be packaged into one chip, or the connection interface unit 102 is distributed outside of a chip containing the memory controlling circuit unit 104.

The memory controlling circuit unit 104 is configured to execute a plurality of logic gates or control commands which are implemented in a hardware form or in a firmware form, so as to perform operations of writing, reading or erasing data in the rewritable non-volatile memory module 106 according to the commands of the host 1000.

The rewritable non-volatile memory module 106 is coupled to the memory controlling circuit unit 104 and configured to store data written from the host system 1000. The rewritable non-volatile memory module 106 may be a Single Level Cell (SLC) NAND flash memory module, a Multi Level Cell (MLC) NAND flash memory module (that is, the flash memory module in which one memory cell is capable of storing two bit data), a Trinary Level Cell (TLC) NAND flash memory module (that is, the flash memory module in which one memory cell is capable of storing three bit data), other flash memory modules or any memory module having the same features.

Figure 6:
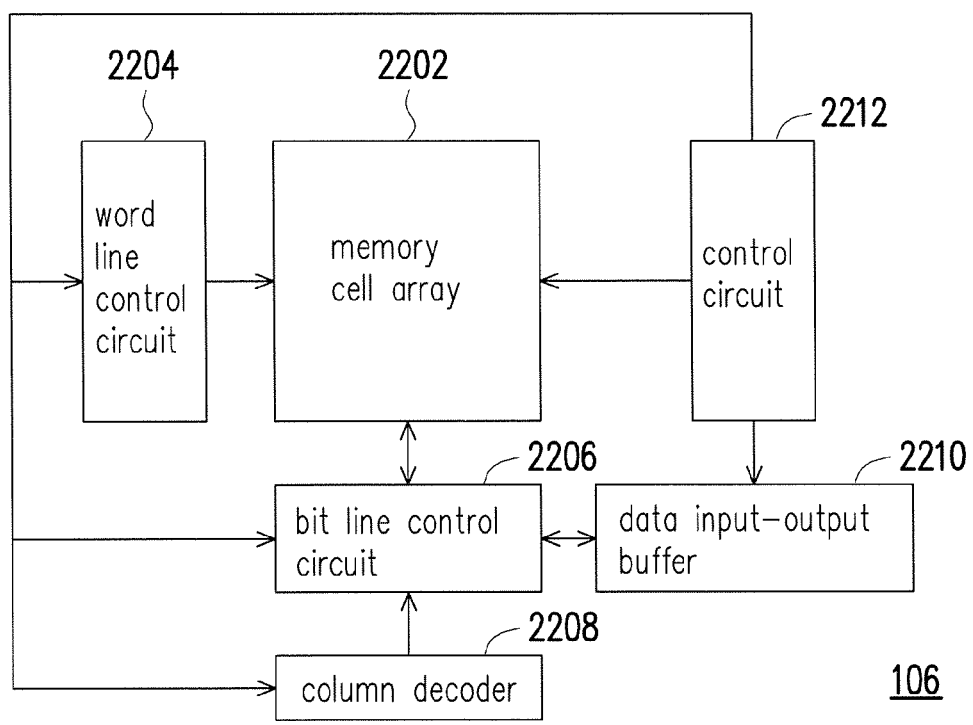
FIG. 6 is a schematic block diagram illustrating the rewritable non-volatile memory module according to an exemplary embodiment.
Figure 7:
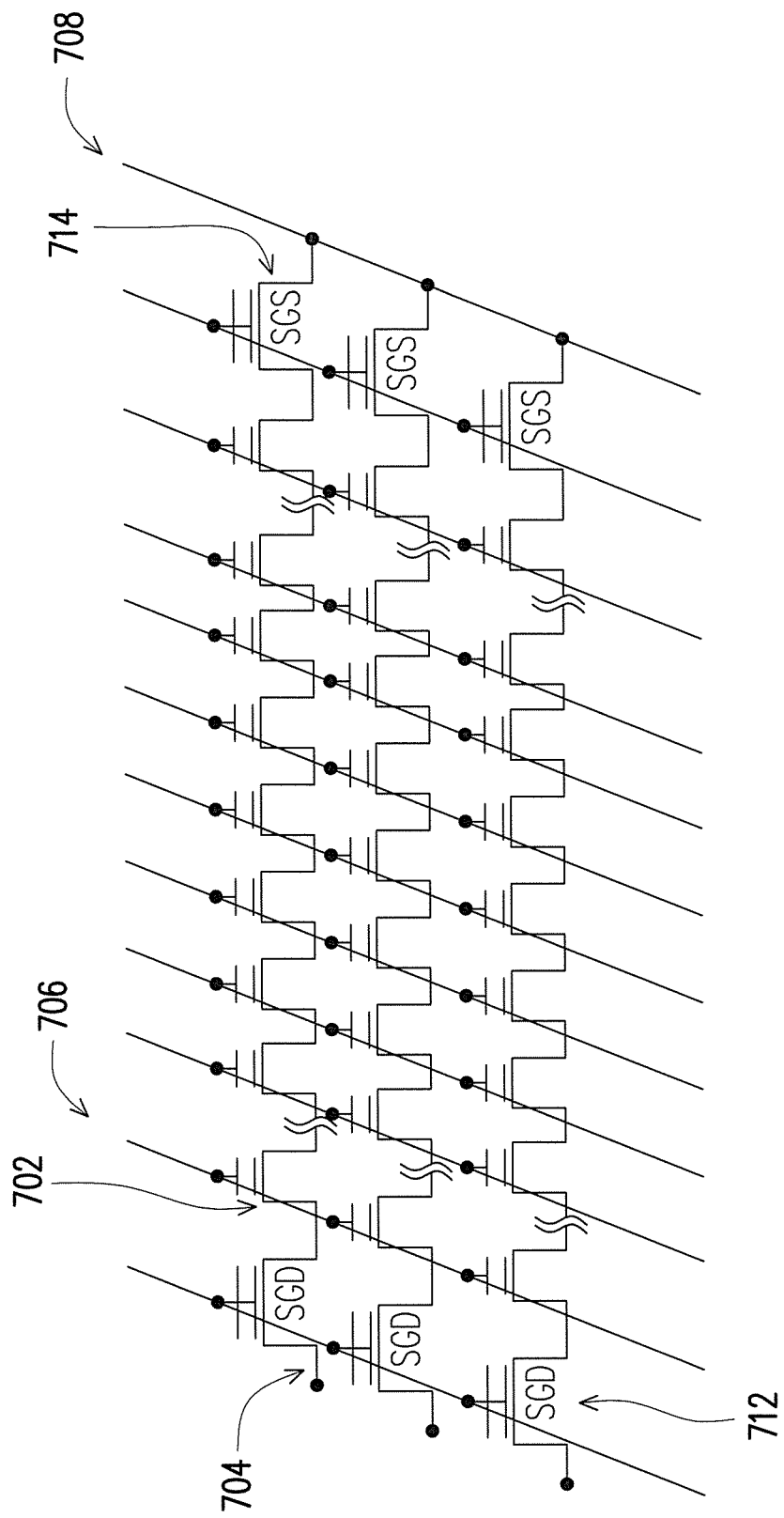
FIG. 7 is a schematic diagram illustrating a memory, cell array according to an exemplary embodiment.

FIG. 6 is a schematic block diagram illustrating the rewritable non-volatile memory module according to an exemplary embodiment. FIG. 7 is a schematic diagram illustrating a memory cell array according to an exemplary embodiment.

Referring to FIG. 6, the rewritable non-volatile memory module 106 includes a memory cell array 2202, a word line control circuit 2204, a bit line control circuit 2206, a column decoder 2208, a data input-output buffer 2210, and a control circuit 2212.

The memory cell array 2202 includes a plurality of memory cells 702 for storing data, a plurality of select gate drain (SGD) transistors 712, and a plurality of select gate source (SGS) transistors 714, as well as a plurality of bit lines 704, a plurality of word lines 706, and a common source line 708 connected to the memory cells (as shown in FIG. 7). The memory cell 702 is disposed on an intersection of the bit line 704 and the word line 706 in a manner of matrix (or in a manner of three-dimensional stacking). In case the memory controlling circuit unit 104 receives a reading command or a writing command, the control circuit 2212 controls the word line control circuit 2204, the bit line control circuit 2206, the column decoder 2208, the data input-output buffer 2210 to write data into the memory cell array 2202 or read data from the memory cell array 2202. Therein, the word line control circuit 2204 is configured to control voltages applied to the word lines 706; the bit line control circuit 2206 is configured to control voltages applied to the bit lines 704; the column decoder 2208 is configured to select the corresponding bit line according to a row address in a command; and the data input-output buffer 2210 is configured to temporarily store the data.

The memory cells in the rewritable non-volatile memory module 106 store bits by the changing of a threshold voltage. Specifically, there is a charge trapping layer between a control gate and a channel of each memory cell. Through applying a writing voltage to the control gate, an amount of electrons in the charge trapping layer are changed, thereby changing the threshold voltage of the memory cell. This process of the changing of the threshold voltage is also known as "writing data in the memory cell" or "programming the memory cell". As the threshold voltage is changed, each of the memory cells of the memory cell array 2202 has a plurality of storage states. Furthermore, the storage states of the memory cells may be determined through the reading voltages, thereby obtaining the bits stored by the memory cells.

Figure 8:
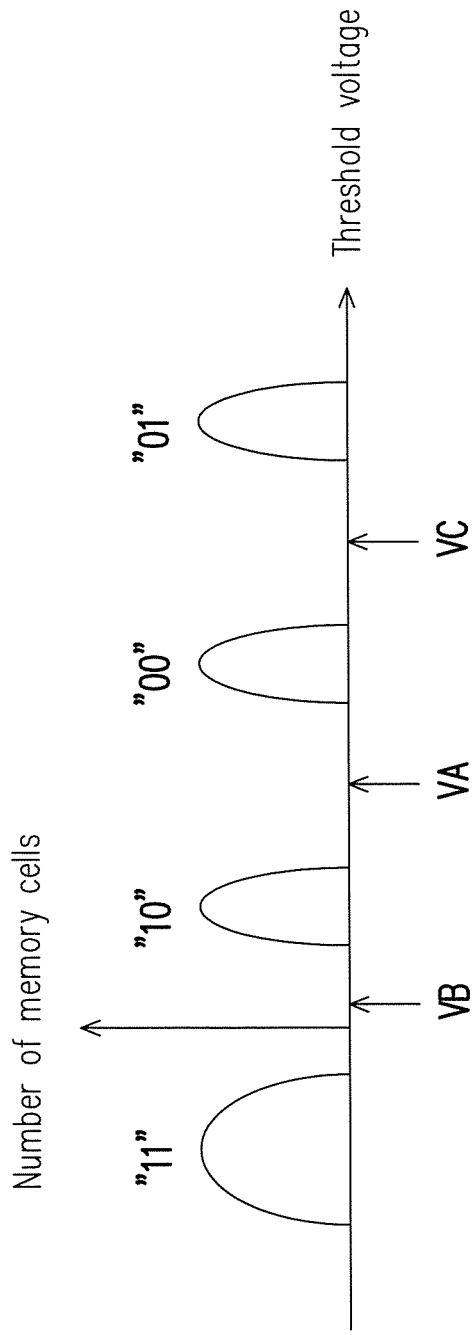
FIG. 8 is a statistical distribution diagram illustrating the corresponded threshold voltages to writing data stored in the memory cell array according to an exemplary embodiment.

FIG. 8 is a statistical distribution diagram illustrating the corresponded threshold voltages to writing data stored in the memory cell array according to an exemplary embodiment.

Referring to FIG. 8 and taking a MLC NAND flash memory module as an example. As the threshold voltage is different, each of the memory cells has four storage states, and the storage states respectively represent as bits "11", "10", "00", and "01". In other words, each of the storage states includes a Least Significant Bit (LSB) and a Most Significant Bit (MSB). In the present exemplary embodiment, the first bit counted from the left in the storage state (which is "11", "10", "00", and "01") is LSB, and the second bit counted from the left in the storage state is MSB. Accordingly, in the present exemplary embodiment, each of the memory cells may store two bits. It is noted that the threshold voltages and the corresponded storage state thereto illustrated in FIG. 8 is merely as an example. In another exemplary embodiment of the invention, the corresponding relationship between the threshold voltages and the storage states may also be arranged in "11", "10", "01", and "00", or in other arrangements. Furthermore, in another exemplary embodiment, the first bit counted from the left may also be defined as MSB, and the second bit counted from the left may also be defined as LSB.

Figure 9:
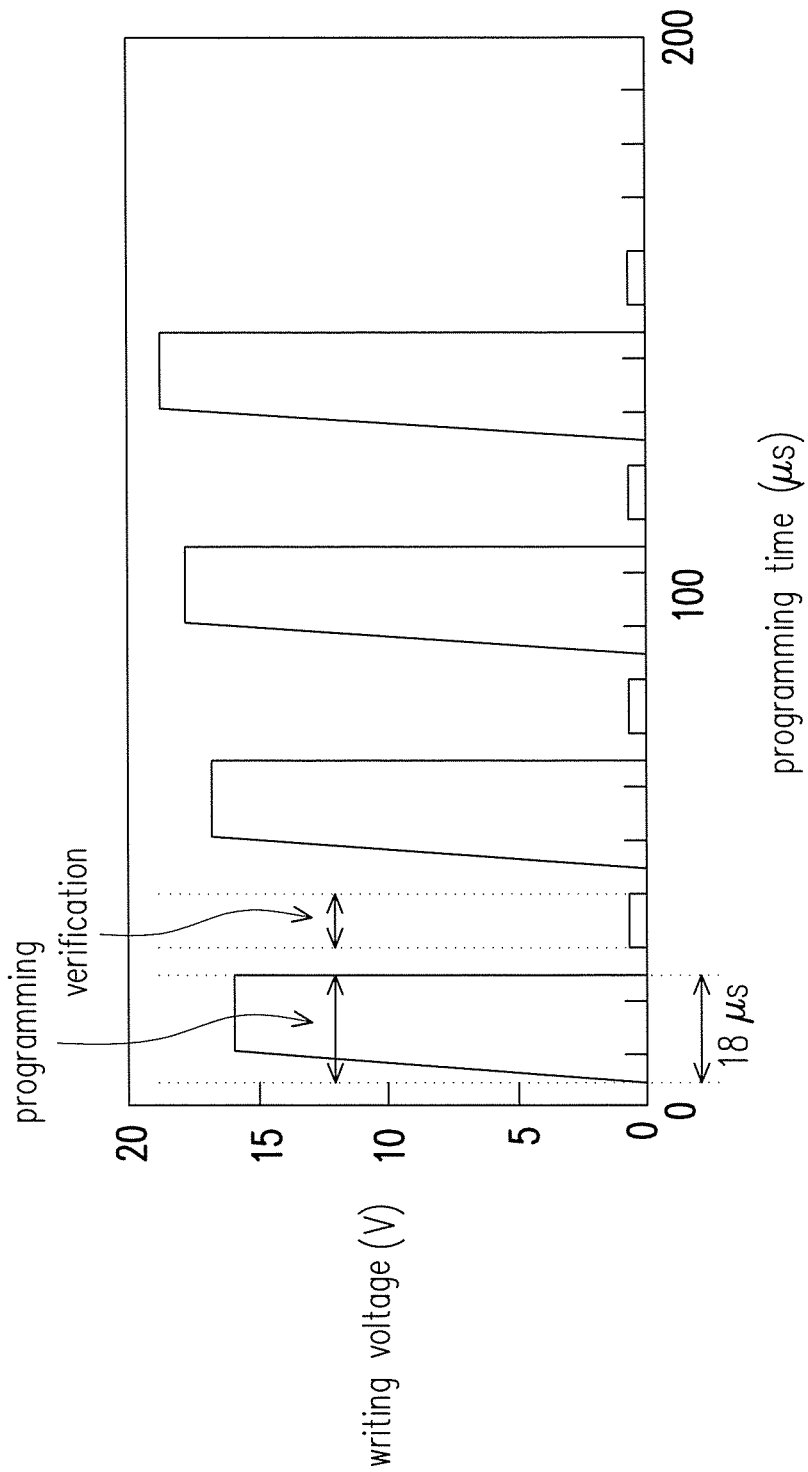
FIG. 9 is a schematic diagram illustrating programming of a memory cell according to an exemplary embodiment.

FIG. 9 is a schematic diagram illustrating programming of a memory cell according to an exemplary embodiment.

Referring to FIG. 9, in the present exemplary embodiment, the memory cell is programmed through applying a pulse writing/threshold voltage verifying method. Particularly, when data are to be written into the memory cell, the memory controlling circuit unit 104 sets an initial writing voltage and a writing voltage pulse time and instructs the control circuit 2212 of the rewritable non-volatile memory module 106 to program the memory cell according to the set initial writing voltage and the set writing voltage pulse time, thereby writing the data into the memory cell. The memory controlling circuit unit 104 then determines whether the memory cell is conducted by applying a verification voltage, so as to determine whether the memory cell is in the correct storage state (having the correct threshold voltage). If the memory cell is not programmed to be in the correct storage state, the memory controlling circuit unit 104 instructs the control circuit 2212 to re-program the memory cell according to the writing voltage pulse time and a new writing voltage obtained by adding an incremental-step-pulse programming (ISPP) adjustment value to the currently administered writing voltage. By contrast, if the programmed memory cell is in the correct storage state, it indicates that the data are correctly written into the memory cell. For instance, the initial writing voltage is set as 16 voltages (V), the writing voltage pulse time is set as 18 microseconds (μs), and the ISPP adjustment value is set as 0.6 V; however, the present invention is not limited thereto.

Figure 10:
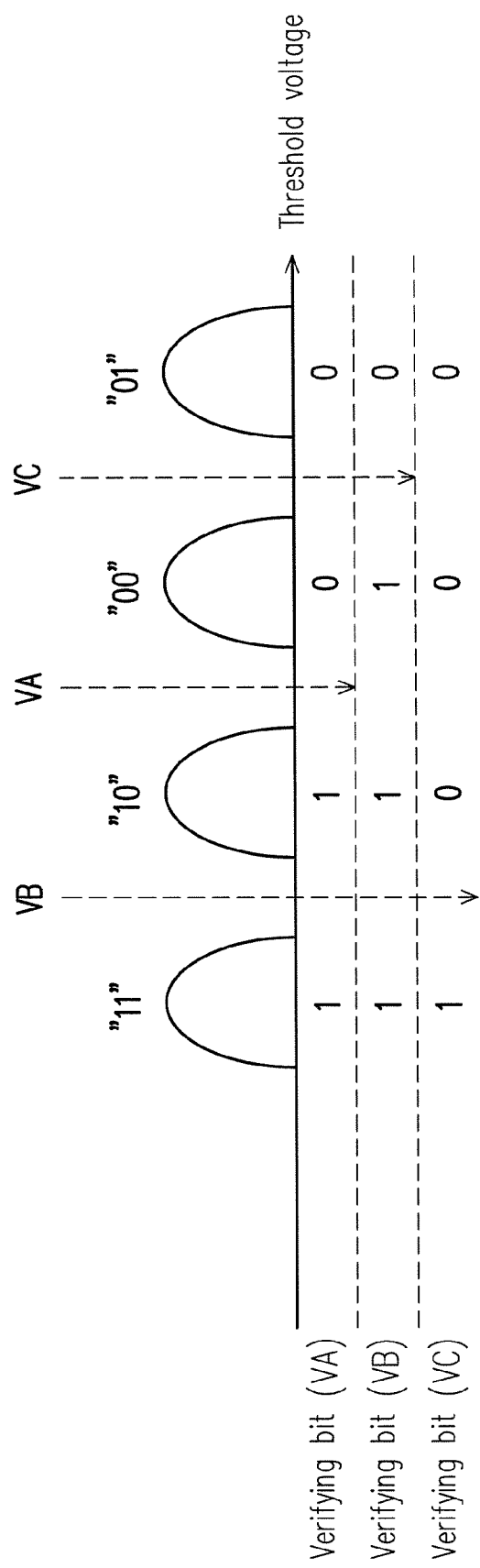
FIG. 10 is a schematic diagram illustrating data reading from the memory cell according to an exemplary embodiment.

FIG. 10 is a schematic diagram illustrating data reading from the memory cell according to an exemplary embodiment, wherein the MLC NAND flash memory module is taken as an example.

Referring to FIG. 10, in order to read a memory cell of the memory cell array 2202, the reading voltage is applied to the control gate; by means of the conduction state of the memory cell, the data stored in the memory cell may be identified. A verifying bit (VA) is to indicate whether the memory cell is conducted when applied with the reading voltage VA; a verifying bit (VC) is to indicate whether the memory cell is conducted when applied with the reading voltage VC; a verifying bit (VB) is to indicate whether the memory cell is conducted when applied with the reading voltage VB. Here, it is assumed that the memory cell is conducted when the verifying bit is "1", and the memory cell is not conducted when the verifying bit is "0". In an operation for reading the memory cell, the word line control circuit 2204 applies the reading voltage VA first to the control gate, and determines the LSB according to whether the memory cell is conducted and the corresponding equation (1):

$$\text{LSB}=(VA)\text{Lower\_}pre1 \quad (1)$$

In the equation (1), (VA)Lower_pre1 represents a verifying bit (VA).

For instance, when the reading voltage VA is lower than the threshold voltage in the memory cell, the memory cell is not conducted, and the verifying bit (VA) is '0'. When the reading voltage VA is higher than the threshold voltage in the memory cell, the memory cell is conducted, and the verifying bit (VA) is '1'.

Next, the word line control circuit 2204 respectively applies the reading voltage VB and the reading voltage VC to the control gate and determines the MSB according to whether the memory cell is conducted and the corresponding equation (2):

$$\text{MSB}=((VB)\text{Upper\_}pre2) \text{ xor } (\sim(VC)\text{Upper\_}pre1) \quad (2)$$

In the equation (2), (VC)Upper_pre1 represents the verifying bit (VC), and (VA)Upper_pre2 represents the verifying bit (VB), wherein the symbol "~" represents inversion.

Therefore, according to the equation (2), when the reading voltage VB and the reading voltage VC are both lower than the threshold voltage in the memory cell, the verifying bit (VB) is "0" and the verifying bit (VC) is "0", and in this case, the MSB is identified as "1". When the reading voltage VC is higher than the threshold voltage in the memory cell and the reading voltage VB is lower than the threshold voltage in the memory cell, the verifying bit (VB) and the verifying bit (VC) are "1", and in this case, the MSB is identified as "1".

It should be understood that the exemplary MLC NAND flash memory described herein should not be construed as limitation to the present invention, and data can be read from any other NAND flash memory through the principle described above. Furthermore, in another exemplary embodiment, the MSB and the LSB may also be calculated by formula different from the equation (1) and (2). The invention does not intend to limit the way of calculating the MSB and the LSB.

Figure 11:
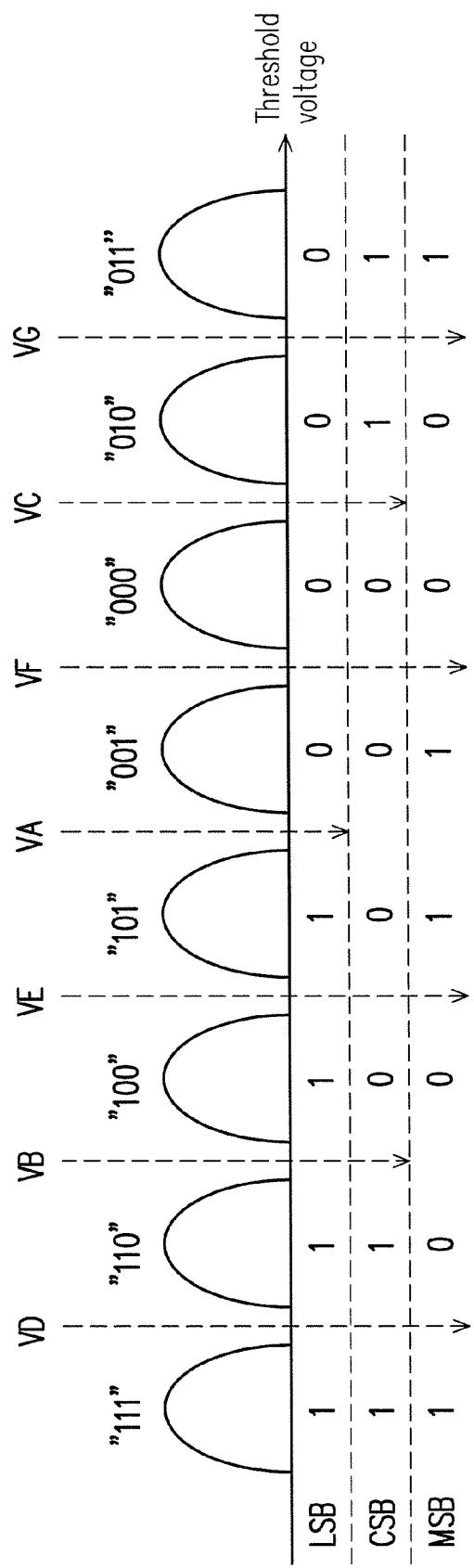
FIG. 11 is another schematic diagram illustrating data reading from the memory cell according to an exemplary embodiment.

FIG. 11 is another schematic diagram illustrating data reading from the memory cell according to an exemplary embodiment.

Referring to FIG. 11 and taking the MLC NAND flash memory module as an example. Each storage states includes a Least Significant Bit (LSB) which is the first bit counted from the left, a Center Significant Bit (CSB) which is the second bit counted from the left, and a Most Significant Bit (MSB) which is the third bit counted from the left. In the present exemplary embodiment, the memory cell may have eight storage states (which are "111", "110", "100", "101", "001", "000", "010", and "011") according to different threshold voltages. By applying the reading voltages VA to VG to the control gate, the bits stored by the memory cell can be identified.

Figure 12:
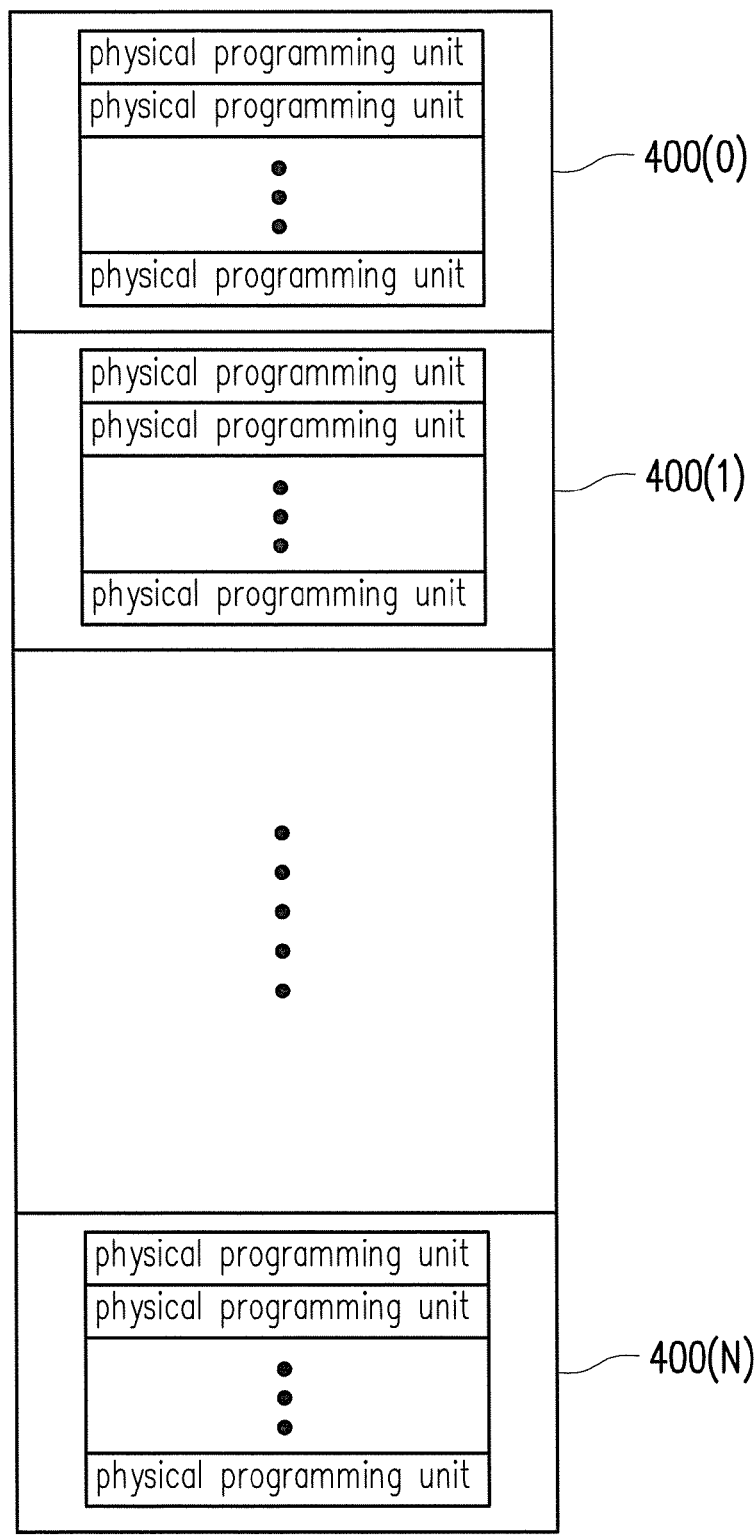
FIG. 12 is a schematic diagram illustrating the rewritable non-volatile memory module managing according to an exemplary embodiment of the invention.

FIG. 12 is a schematic diagram illustrating the rewritable non-volatile memory module managing according to an exemplary embodiment of the invention.

Reference to FIG. 12, the memory cells 702 of the rewritable non-volatile memory module 106 constitute a plurality of physical programming units, and these physical programming units constitute a plurality of physical erasing units 400(0)-400(N). Specifically, the memory cells on the same word line constitute one or the plurality of physical programming units. If each of the memory cells can store more than two bits, the physical programming units on the same word line may be classified into a lower physical programming unit and an upper physical programming unit. For instance, the LSBs of each memory cells constitute the lower physical programming units and the MSBs of each memory cells constitute the upper physical programming units. In general, a writing speed of the lower physical programming unit is faster than a writing speed of the upper physical programming unit. In the present exemplary embodiment, the physical programming unit is a minimum unit for programming. That is, the physical programming unit is the minimum unit for writing data. For example, the physical programming unit is a physical page or a physical sector. In case the physical programming unit is the physical page, each physical programming unit usually includes a data bit area and a redundancy bit area. The data bit area has multiple physical sectors configured to store user data, and the redundant bit area is configured to store system data (e.g., error correcting code). In the present exemplary embodiment, each of the data bit areas contains 32 physical sectors, and a size of each physical sector is 512-byte (B). However, in other exemplary embodiments, the data bit area may also include 8, 16, or more or less of the physical sectors, and amount and sizes of the physical sectors are not limited in the invention. On the other hand, the physical erasing unit is a minimum unit for erasing. Namely, each physical erasing unit contains the least number of memory cells to be erased together. For instance, the physical erasing unit is a physical block.

Figure 13:
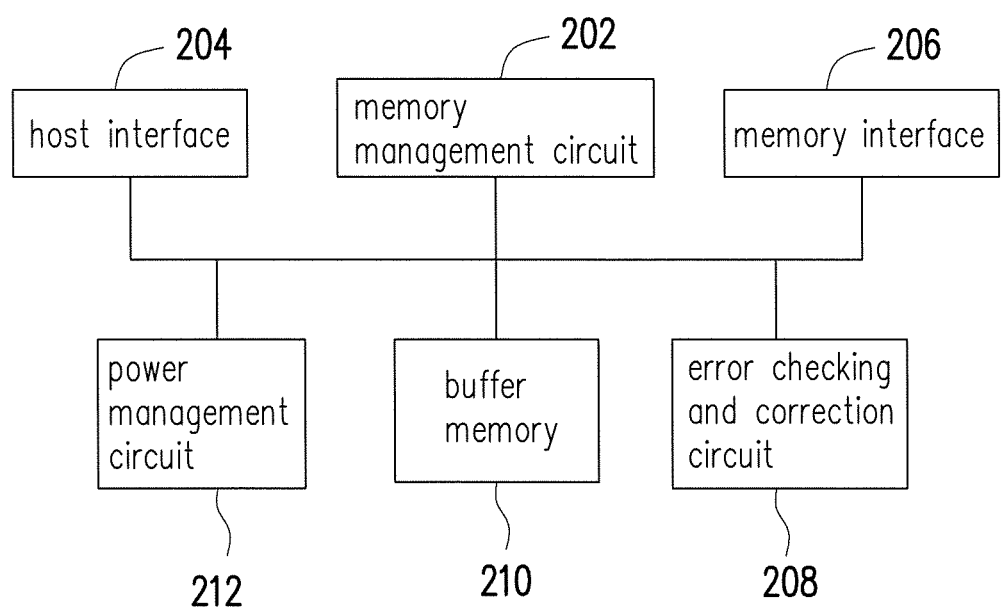
FIG. 13 is a schematic block diagram illustrating the memory controlling circuit unit according to an exemplary embodiment.

FIG. 13 is a schematic block diagram illustrating the memory controlling circuit unit according to an exemplary embodiment. It should be understood that the memory controlling circuit unit depicted in FIG. 13 is merely exemplary and should not be construed as a limitation to the present invention.

Referring to FIG. 13, the memory controlling circuit unit 104 includes a memory management circuit 202, a host interface 204, a memory interface 206, and an error checking and correction circuit 208.

The memory managing circuit 202 is configured to control the whole operation of the memory controlling circuit unit 104. Particularly, the memory management circuit 202 has a plurality of control instructions, and when the memory storage device 100 is operated, the control instructions are executed to perform a data writing operation, a data reading operation, a data erasing operation, and so on. Operations of the memory management circuit 202 are similar to the operations of the memory controlling circuit unit 104, thus related description is omitted hereinafter.

In the present exemplary embodiment, the control commands of the memory management circuit 202 are implemented in a form of a firmware. For example, the memory management circuit 202 has a microprocessor unit (not illustrated) and a ROM (not illustrated), and the control commands are burned into the ROM. When the memory storage device 100 is operated, the control commands are executed by the microprocessor to perform operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 106 to the RAM of the memory management circuit 202 when the memory control circuit unit 104 is enabled. Next, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 220 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the physical block of the rewritable non-volatile memory module 106; the memory writing circuit is configured to issue a write command to the rewritable non-volatile memory module 106 in order to write data to the rewritable non-volatile memory module 106; the memory reading circuit is configured to issue a read command to the rewritable non-volatile memory module 106 in order to read data from the rewritable non-volatile memory module 106; the memory erasing circuit is configured to issue an erase command to the rewritable non-volatile memory module 106 in order to erase data from the rewritable non-volatile memory module 106; the data processing circuit is configured to process both the data to be written to the rewritable non-volatile memory module 106 and the data to be read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

The error checking and correcting circuit 208 is coupled to the memory management circuit 202 and configured for performing an error checking and correcting process to ensure the correctness of data. Specifically, when the memory management circuit 202 receives a write command from the host system 1000, the error checking and correcting circuit 208 generates an error correcting code (ECC) or an error detecting code (EDC) for data corresponding to the write command, and the memory management circuit 202 writes data and the ECC or the EDC corresponding to the write command to the rewritable non-volatile memory module 106. Subsequently, when the memory management circuit 202 reads the data from the rewritable non-volatile memory module 106, the corresponding ECC or the corresponding EDC are also read from the rewritable non-volatile memory module 106 simultaneously, and the error checking and correcting circuit 208 executes the error checking and correcting procedure for the read data based on the ECC or the EDC.

In an exemplary embodiment of the invention, the memory control circuit unit 104 further includes a buffer memory 210 and a power management circuit 212. The buffer memory 210 is coupled to the memory management circuit 202 and configured to temporarily store data and commands from the host system 1000 or data from the rewritable non-volatile memory module 106. The power management unit 212 is coupled to the memory management circuit 202 and configured to control the power of the memory storage device 100.

Figure 14:
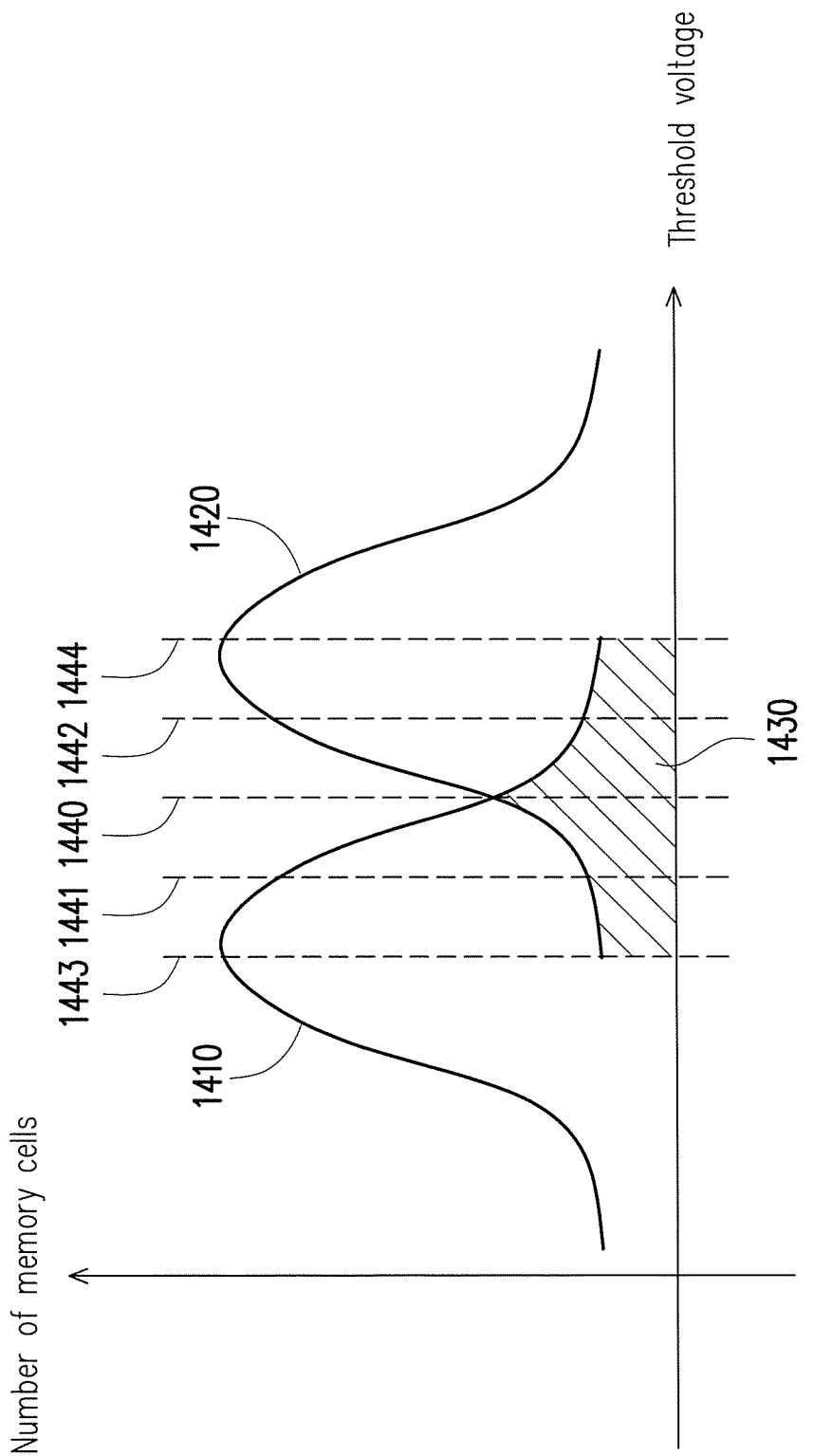
FIG. 14 is a schematic diagram illustrating hard bit mode decoding according to an exemplary embodiment.

FIG. 14 is a schematic diagram illustrating hard bit mode decoding according to an exemplary embodiment.

Referring to FIG. 14 and taking the SLC flash memory as an example. A distribution 1410 and a distribution 1420 are represented as the storage states of the first memory cells, and the distribution 1410 and the distribution 1420 are respectively represented as the different storage states. These first memory cells may belong to the same physical programming unit or different physical programming units. The invention is not limited thereto. Herein, it is assumed that the bit stored by a memory cell is "1" when the memory cell belongs to the distribution 1410; the bit stored by the memory cell is "0" when the memory cell belongs to the distribution 1420. When the memory management circuit 202 reads a memory cell by the reading voltage 1440, the memory management circuit 202 obtains a verifying bit, which is to indicate whether the memory cell is conducted. Herein, it is assumed that the verifying bit is "1" when the memory cell is conducted, and the verifying bit is "0" when the memory cell is not conducted, and the invention is not limited thereto. If the verifying bit is "1", the memory management circuit 202 determines that the memory cells belongs to the distribution 1410; on the contrary, if the verifying bit is "0", the memory management circuit 202 determines that the memory cells belongs to the distribution 1420. However, the distribution 1410 and the distribution 1420 are overlapped in the region 1430. That is, there are several memory cells which should belong to the distribution 1410 but are identified as belonging to the distribution 1420, and there are several memory cells which should belong to the distribution 1420 but are identified as belonging to the distribution 1410.

In the present exemplary embodiment, the memory management circuit 202 reads the first memory cells according to the first reading voltage (such as the reading voltage 1441) first, to obtain the verifying bits (which is also referred to as the first verifying bit) of the first memory cells.

The error checking and correction circuit 208 executes the decoding procedure (also referred to as the first decoding procedure) including a probability decoding algorithm to obtain a plurality of decoded bits (also referred to as the first decoded bits). In the present exemplary embodiment, the probability decoding algorithm is operated by viewing possible decoded results of a symbol as a candidate, representing the information inputted during decoding or values during calculations by the probability values of the candidates or the probability ratio among the candidates, so as to decide the most possible candidate. For instance, if a symbol has two candidates (bits "0" and "1"), the probability decoding algorithm is operated by calculating the most possible candidate according to the probabilities of bit "0" and bit "1", or by calculating the most possible candidate according to the ratio between the probabilities of bit "0" and bit "1". If there are N candidates, such as in the case of finite field whose possible values are 0 to N−1 (wherein N is a positive integer, and each candidates represents a plurality of bits), then the probability decoding algorithm is operated by calculating the probabilities of N candidates respectively to decide the most possible candidate, or by making the probability of one of the values as the denominator and calculating the relative ratio of the probabilities to decide the most possible candidate. In an exemplary embodiment, the ratio of the probabilities above may also be represented in a form of the logarithm.

In the present exemplary embodiment, the probability decoding algorithm may be a convolutional code, a turbo code, a low-density parity-check code, or may be other algorithms with the characteristic of probability decoding. For instance, a finite state machine is used to perform encoding and decoding in the convolutional code and the turbo code. In the present exemplary embodiment, the most possible several states are calculated according to the verifying bits, so as to obtain decoded bits. The low-density parity-check code is exemplified below.

If the low-density parity-check code is used, during executing the first decoding procedure according to the verifying bits, the memory managing circuit 202 further obtains an initial decoding value (also referred to as the first initial decoding value) of each memory cells according to each verifying bit. For example, if the verifying bit is "1", the memory managing circuit 202 sets the initial decoding value of the corresponding memory cell to be −n; if the verifying bit is "0", the initial decoding value is n, wherein n is a positive number and the invention does not intend to limit the value of the positive integer n.

Next, the error checking and correction circuit 208 executes an iterative decoding of the low-density parity-check algorithm according to these initial decoding values to obtain a plurality of first decoded bits. In the iterative decoding, these initial decoding values are constantly updated to represent a probability value, and the probability value is also referred to as reliability or a belief. The updated initial decoding values are transferred to a plurality of decoded bits. The error checking and correction circuit 208 then takes these decoded bits as a vector, and performs a module-2 matrix multiplication to the vector and a parity-check matrix of the low-density parity-check algorithm to obtain a plurality of syndromes. The syndromes may be used to determine whether a codeword formed by the decoded bits is a valid codeword. If the codeword formed by the decoded bits is a valid codeword, the iterative decoding is stopped and the decoded bits are output by the error checking and correction circuit 208 to form the first decoded bits. If the codeword formed by the decoded bits is an invalid codeword, the initial decoding values are constantly updated and new decoded bits are obtained to perform next iteration. When the frequency of the iterations reaches the predetermined frequency of the iterations, the iterative decoding is also stopped, wherein the decoded bits obtained in the last iteration are referred to as the first decoded bits. The error checking and correction circuit 208 determines whether the decoding is successful by using these first decoded bits. For instance, the decoding is successful if the first decoded bits form a valid codeword as determined according to the syndromes; the decoding is failed if the first decoded bits form an invalid codeword.

In another exemplary embodiment, the probability decoding algorithm included in the decoding procedure is convolutional code and the turbo code, and other error correcting codes are also included in the decoding procedure. For instance, the convolutional code and the turbo code may be used together with parity codes of any algorithms. After decoding part of the convolutional code or the turbo code during the decoding procedure is finished, the parity codes may be used to determine whether the decoded bits obtained are valid codewords, and to further determine whether the decoding is successful.

Regardless of which error correcting codes are used, if the decoding is failed, it means that the first memory cells have uncorrectable error bits. If the decoding is failed, the reading voltages are re-obtained by the memory managing circuit 202, and the first memory cells are read by the memory managing circuit 202 using the re-obtained reading voltages (also referred to as the second reading voltage such as the reading voltage 1442) to re-obtain the verifying bits of the memory cells (also referred to as the second verifying bits). The memory managing circuit 202 executes the first decoding procedure above according to the re-obtained verifying bits to obtain a plurality of second decoded bits.

In an exemplary embodiment, the error checking and correction circuit 208 uses the second decoded bits to determine whether the decoding is successful (that is, whether the second decoded bits form a valid codeword). If the decoding is determined failed by using the second decoded bits, the memory managing circuit 202 determines whether a frequency of re-obtaining the second reading voltages exceeds a predetermined frequency. If the frequency of re-obtaining the second reading voltages already exceeds the predetermined frequency, the re-obtaining the second reading voltages is stopped by the memory management circuit 202. If the frequency of re-obtaining the second reading voltages does not exceed the predetermined frequency, the memory management circuit 202 re-obtains the second reading voltages (such as the reading voltage 1443) and reads the first memory cells according to the re-obtained second reading voltages to re-obtain the second verifying bits. The memory management circuit 202 also executes the first decoding procedure according to the re-obtained second verifying bits.

In other words, when there are uncorrectable error bits, through re-obtaining the reading voltages, the verifying bits of some memory cells are changed. Thereby, several probability values in the probability decoding algorithm are changed and thus the decoding results of the decoding procedures may be possibly changed. Logically, the operation of re-obtaining the reading voltages is to flip several bits in a codeword, and to re-decode the new codeword. In some cases, the codeword cannot be decoded before being flipped (which has uncorrectable error bits) may possibly become decodable after being flipped. Furthermore, in an exemplary embodiment, the memory managing circuit 202 tries to decode several times until the frequency of tries exceeds the predetermined frequency. However, the invention does not intend to limit the predetermined frequency.

In FIG. 14, the reading voltage 1440 is a predetermined reading voltage, which means that the error bits are the least under the reading voltage 1440. The predetermined reading voltage 1440 may be obtained by the memory managing circuit 202 through various algorithms. For instance, the memory managing circuit 202 may first write in the known bits to these first memory cells, and scan the number of error bits of the first memory cells under various threshold voltages to obtain the predetermined reading voltage. The invention does not intend to limit as to how to calculate the predetermined reading voltage. In the present exemplary embodiment, when the memory managing circuit 202 re-obtains the reading voltage, the new reading voltages and the old reading voltages are on different sides of the predetermined reading voltage 1440. For instance, the memory managing circuit 202 uses the reading voltage 1441 first, and then adjusts the predetermined reading voltage 1440 according to an offset value (which may be positive or negative) to obtain the reading voltage 1442, wherein the predetermined reading voltage 1440 is between the reading voltage 1441 and the reading voltage 1442. In an exemplary embodiment, the offset value is calculated according to a difference between the reading voltage 1441 and the predetermined reading voltage 1440. For example, the memory managing circuit 202 may multiply the difference between the reading voltage 1441 and the predetermined reading voltage 1440 by a multiplier to obtain the offset value, and subtract the offset value from the predetermined reading voltage 1440 to obtain the reading voltage 1442, wherein the above can be written as the following equation (3):

$$R_{i+1} = K - Q(R_i - K) \quad (3)$$

$R_{i+1}$ represents the reading voltage used in the (i+1)th try and i is a positive integer. Q is a real number, which represents the multiplier above. K is a predetermined reading voltage.

In another exemplary embodiment, the new reading voltages and the old reading voltages may also be on the same side of the predetermined reading voltage 1440. Alternatively, the reading voltage used by the memory managing circuit 202 at first is the predetermined reading voltage 1440, and then reading voltage 1441-1444 are sequentially be used. The invention does not intend to limit the values of the new reading voltages and the old reading voltages.

It should be noted that the SLC flash memory is exemplified in FIG. 14, but the steps of re-obtaining the reading voltages may be also applied to the MLC flash memory or the TLC flash memory. As shown in FIG. 10, the LSB of a memory cell is flipped by changing the reading voltage VA, and the MSB of a memory cell may be flipped by changing the reading voltage VB or VC. Accordingly, a codeword may be changed to another codeword by either changing the reading voltage VA, VB or VC. The results of changing the codewords may also be applied to the TLC flash memory of FIG. 11. The invention does not intend to limit which of the SLC flash memory, the MLC flash memory or the TLC flash memory is used.

In an exemplary embodiment of FIG. 14, the initial decoding value of the memory cell is classified into two values (such as n and −n) according to the verifying bit. The iterative decoding executed according to the two values is also referred to as a hard bit mode iterative decoding. However, the steps of changing the reading voltages may also be applied to a soft bit mode iterative decoding, wherein the initial decoding value of each memory cells is determined by the plurality of verifying bits. Note that the probability values of the bits are calculated in the iterative decoding for either the hard bit mode or the soft bit mode, and thus both the hard bit mode and the soft bit mode belong to the probability decoding algorithm.

Figure 15A:
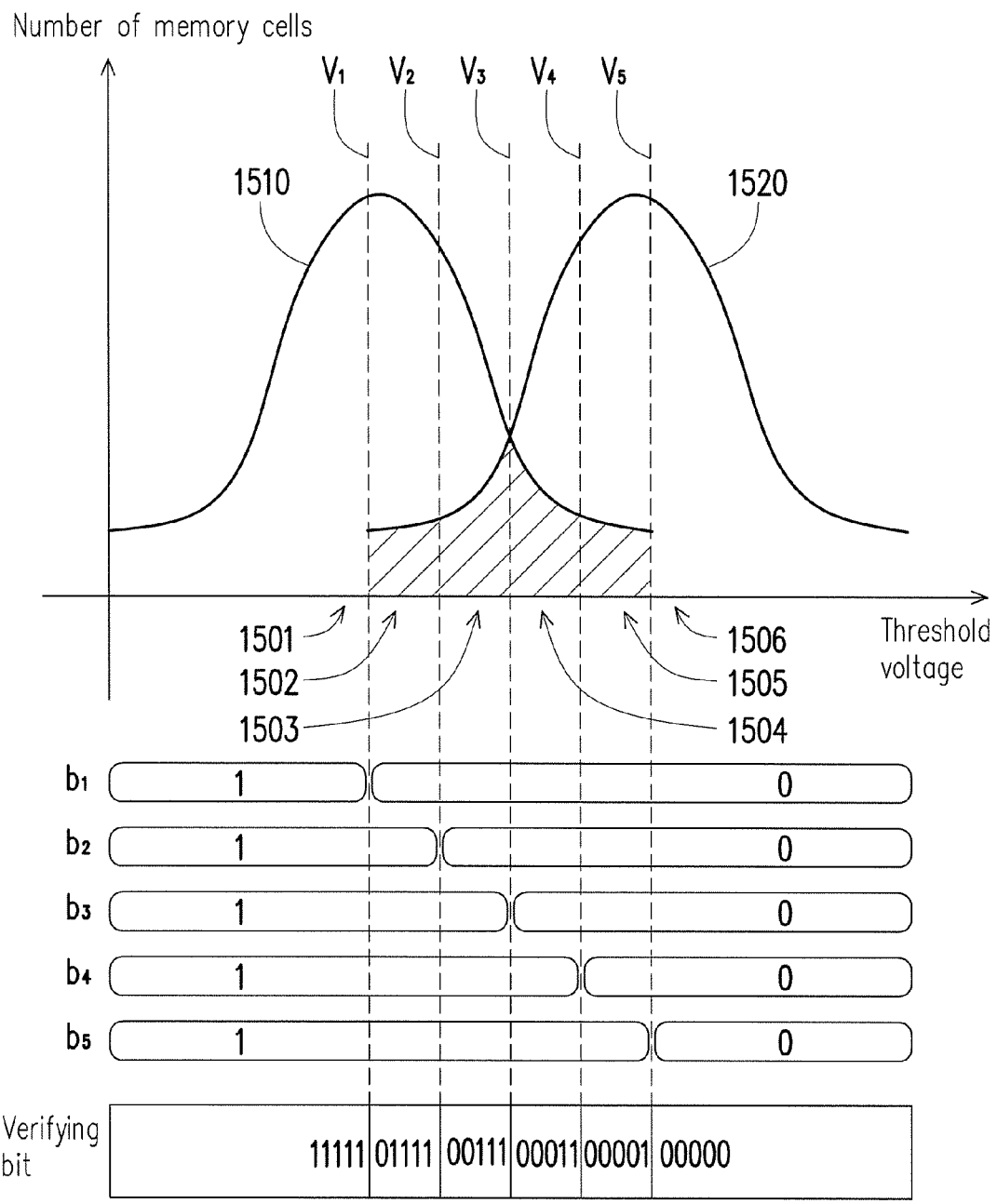
FIG. 15A and FIG. 15B are schematic diagrams illustrating soft bit mode decoding according to an exemplary embodiment.
Figure 15B:
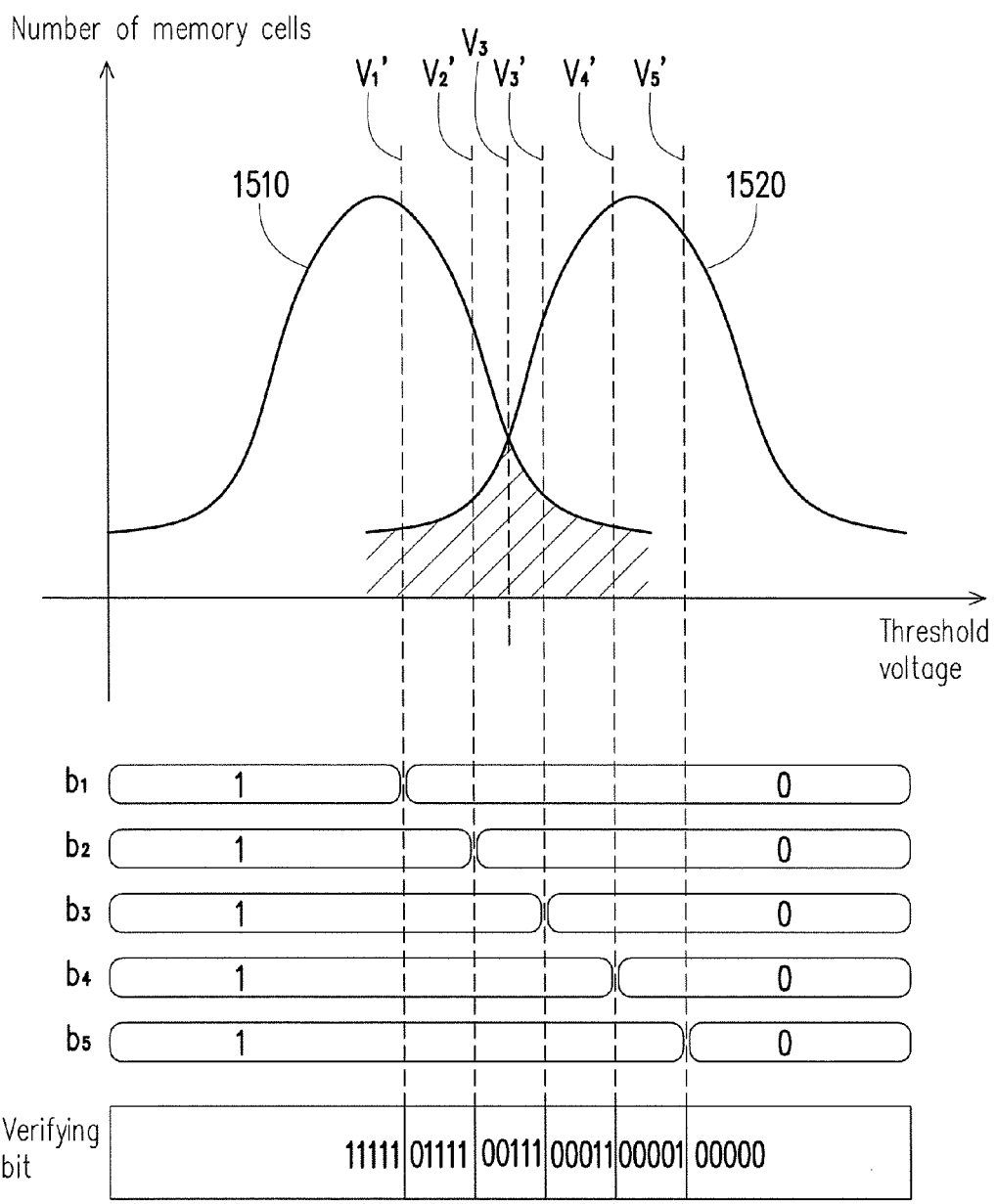

FIG. 15A and FIG. 15B are schematic diagrams illustrating soft bit mode decoding according to an exemplary embodiment.

As described above, when the reading voltage is applied to the control gate of a memory cell, the verifying bit obtained by the memory management circuit 202 is "0" or "1" depending on whether the memory cell is conducted. Herein, it is assumed that the corresponding verifying bit is "0" if the memory cell is not conducted, and otherwise the corresponding verifying bit is "1". In FIG. 15A, the reading voltages $V_1$ to $V_5$ (also referred to as the first reading voltages) are applied to the memory cell by the memory management circuit 202 to obtain five verifying bits (also referred to as the first verifying bits). Specifically, the reading voltage $V_1$ corresponds to the verifying bit $b_1$; the reading voltage $V_2$ corresponds to the verifying bit $b_2$; the reading voltage $V_3$ corresponds to the verifying bit $b_3$; the reading voltage $V_4$ corresponds to the verifying bit $b_4$; the reading voltage $V_5$ corresponds to the verifying bit $b_5$. If the threshold voltage of the memory cell is in the region 1501, then the verifying bits obtained by the memory management circuit 202 from the verifying bit $b_1$ to the verifying bit $b_2$ is "11111"; if the threshold voltage of the memory cell is in the region 1502, then the verifying bits is "01111"; if the threshold voltage of the memory cell is in the region 1503, then the verifying bits is "00111"; if the threshold voltage of the memory cell is in the region 1504, then the verifying bits is "00011"; if the threshold voltage of the memory cell is in the region 1505, then the verifying bits is "00001"; if the threshold voltage of the memory cell is in the region 1506, then the verifying bits is "00000".

In the present exemplary embodiment, one of the reading voltages $V_1$ to $V_5$ is set as a sign reading voltage. The sign reading voltage is to determine the sign of the initial decoding values. For instance, if the reading voltage $V_3$ is the sign reading voltage, then the initial decoding values corresponding to the regions 1501 to 1503 are less than 0, and the initial decoding values corresponding to the regions 1504 to 1506 are greater than 0. Furthermore, the probability of the memory cell belonging to the distribution 1510 and the probability of the memory cell belonging to the distribution 1520 can be calculated in advance for each region. A Log Likelihood Ratio (LLR) can be calculated according to these two probabilities, and absolute values of the initial decoding values can be determined by the LLR. Accordingly, the memory management circuit 202 obtains the initial decoding values of the memory cells under the soft bit mode (also referred to as the first initial decoding values) according to the sign reading voltage and the verifying bits $b_1$ to $b_5$. In an exemplary embodiment, the initial decoding values corresponding to each region may be calculated in advance and be stored in a lookup table. The memory management circuit 202 may provide the verifying bits $b_1$ to $b_5$ to the lookup table thereby obtaining the corresponding initial decoding value. In other words, in actual operations, the initial decoding values of the memory cells under the soft bit mode may also be obtained by the memory management circuit 202 according to the verifying bits $b_1$ to $b_5$ without referring to the sign reading voltages. Furthermore, different lookup tables may be used by the memory management circuit 202 if different sign reading voltages are set.

After the memory management circuit 202 obtains the initial decoding values, the error checking and correction circuit 208 executes the iterative decoding to the initial decoding values to obtain the plurality of decoded bits (also referred to as the first decoded bits), and determines whether the decoding is successful by using these decoded bits. If the decoding is failed, the reading voltages (also referred to as the second reading voltages) may be re-obtained by the memory management circuit 202. For instance, the memory management circuit 202 may obtain five offset values according to the difference between the reading voltages $V_1$ to $V_5$ and the predetermined voltages $V_3$, and adjust the predetermined voltages $V_3$ according to the five offset values (such as subtracting the five offset values) to obtain new reading voltages. In other words, the equation (3) above may also be used in the soft bit mode. For instance, as shown in FIG. 15B, the reading voltages $V'_1$ to $V'_5$ are the changed reading voltages. In the present exemplary embodiment, sign distributions of the initial decoding values are symmetrical before and after the change, that is, the reading voltage $V_3$ in FIG. 15A and the reading voltages $V'_3$ in FIG. 15B are the sign reading voltages. In another perspective, the number of the reading voltages which is less than the sign reading voltages is the same as the number of the reading voltages which is greater than the sign reading voltages. In the exemplary embodiment of FIG. 15B, spacing between the reading voltages $V'_1$ to $V'_5$ are not changed. However, the reading voltages $V_1$ to $V_5$ may also be arbitrarily changed by the memory management circuit 202 to obtain new reading voltages, and the amplitude of the change of each reading voltages $V_1$ to $V_5$ may be the same or different. Furthermore, in FIG. 15B, the predetermined reading voltages $V_3$ is between the reading voltages $V'_2$ and $V'_3$, but the predetermined reading voltages $V_3$ may also be between any two of the new reading voltages $V'_1$ to $V'_5$, and the invention is not limited thereto.

After re-obtaining the reading voltages, the corresponding Log Likelihood Ratio of each region may also be changed, and thus the different lookup tables are used by the memory management circuit 202 to obtain the initial decoding values. Logically, changing the reading voltages is to flip several bits in a codeword and to give different initial decoding values (by changing the values or the signs). Thereby, the codeword cannot be decoded before being changed (which has uncorrectable error bits) may possibly become decodable after being changed.

Referring back to FIG. 15A, in another exemplary embodiment, the memory managing circuit 202 may reset the sign reading voltages to change a codeword. For instance, if the reading voltage $V_3$ is the sign reading voltage, then the initial decoding values corresponding to the region 1504 are greater than 0; but if the reading voltage $V_4$ or $V_5$ are the sign reading voltages, then the initial decoding values corresponding to the region 1504 are less than 0. Accordingly, if the decoding procedures executed by using an original sign reading voltages are not successful, the memory managing circuit 202 may set another reading voltage as the sign reading voltage (also referred to as the second sign reading voltage), and re-obtain the initial decoding values according to the reset sign reading voltage and the original verifying bits. After resetting the sign reading voltages, the sign distributions of the initial decoding values may become unsymmetrical. For instance, if the reading voltage $V_4$ is the new sign reading voltage, then the number of the reading voltages which is less than the reading voltage $V_4$ is different from the number of the reading voltages which is greater than the reading voltage $V_4$. That is, the initial decoding values corresponding to four regions are less than 0, but only the initial decoding values corresponding to one region is greater than 0. In an exemplary embodiment, the memory management circuit 202 first sets the reading voltage $V_3$ which is in the middle part of the reading voltages $V_1$ to $V_5$ as the sign reading voltage, and then sets the reading voltage $V_2$, $V_4$, $V_1$, and $V_5$ as the sign reading voltage sequentially until the decoding is successful. The reading voltages $V_1$ and $V_2$ are located on one side of the reading voltage $V_3$, and the reading voltages $V_3$ and $V_4$ (also referred to as the third sign reading voltage) are located on another side of the reading voltage $V_3$.

It is noted that the reading voltages $V_1$ to $V_5$ are not changed after the new sign reading voltages are set, and thus there is no need for the memory management circuit 202 to reread the first memory cell. In other words, the five verifying bits obtained originally are not changed, and the sign reading voltages are used to change the signs of the initial decoding values. In an exemplary embodiment, the memory management circuit 202 provides the five original verifying bits to different lookup tables to re-obtain the initial decoding values for different sign reading voltages. And next, the error checking and correction circuit 208 executes the iterative decoding according to the re-obtained initial decoding values.

In the exemplary embodiments of FIGS. 15A and 15B, the initial decoding values in a soft bit mode decoding are determined by five verifying bits (reading voltages). However, in another exemplary embodiment, the initial decoding values in a soft bit mode decoding may also be determined by more or less verifying bits, and the invention is not limited thereto.

Figure 16:
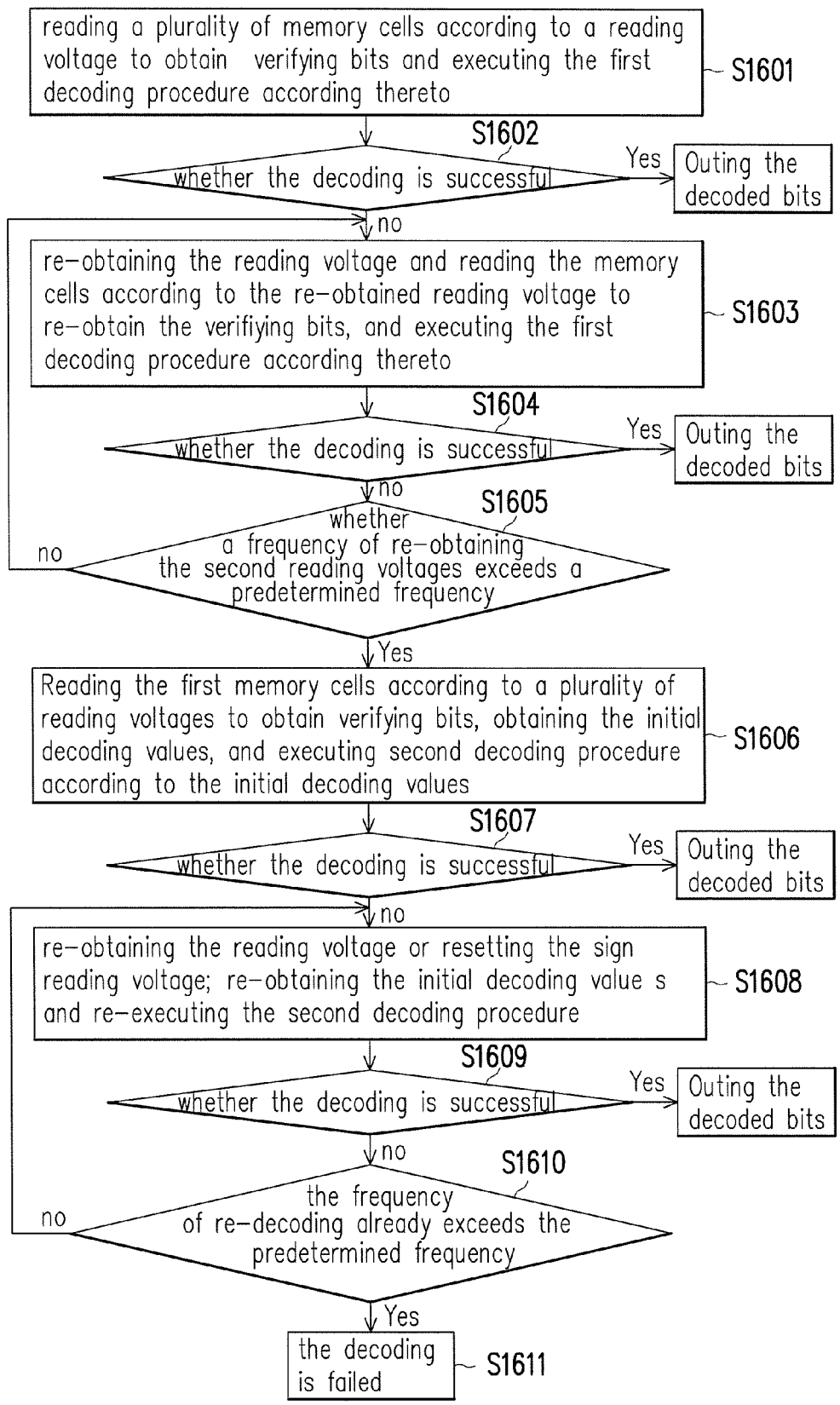
FIG. 16 is a flowchart illustrating execution of the hard bit mode decoding and the soft bit mode decoding according to an exemplary embodiment.

FIG. 16 is a flowchart illustrating execution of the hard bit mode decoding and the soft bit mode decoding according to an exemplary embodiment.

Referring to FIG. 16, in the exemplary embodiments of FIG. 16, a hard bit mode decoding is first performed by the memory management circuit 202. If the hard bit mode decoding is not successful, then an iterative decoding of a soft bit mode decoding is performed. Specifically, in the step S1601, a plurality of memory cells (also referred to as the first memory cells) are read by the memory management circuit 202 according to a reading voltage (also referred to as the first reading voltage) to obtain verifying bits (also referred to as the first verifying bit), and the first decoding procedure (including to obtain an initial decoding value and an iterative decoding of a hard bit mode) is executed according thereto. In the step S1602, the obtained decoded bits are used by the error checking and correction circuit 208 to determine whether the decoding is successful. If the decoding is successful, the decoded bits are output. If the decoding is not successful, in the step S1603, the reading voltage is re-obtained (to become the second reading voltage which is different from the first reading voltage) by the memory management circuit 202, and the first memory cells are read according to the re-obtained reading voltage to re-obtain the verifying bit (also referred to as the second verifying bit), and the first decoding procedure is executed according thereto. In the step S1604, the currently obtained decoded bits are used by the error checking and correction circuit 208 to determine whether the decoding is successful. If the decoding is not successful, in the step S1605, whether a frequency of re-obtaining the second reading voltages exceeds a predetermined frequency is determined by the memory management circuit 202. If the frequency of re-obtaining the second reading voltages does not exceed the predetermined frequency, then return to the step S1603.

If the frequency of re-obtaining the second reading voltages exceeds the predetermined frequency, in the step S1606, the first memory cells are read by the memory management circuit 202 according to a plurality of reading voltages (also referred to as the third reading voltages) to obtain verifying bits (also referred to as the third verifying bit), initial decoding values are obtained, and the second decoding procedure (including an iterative decoding of the soft bit mode) is executed according to the initial decoding values. In the step S1607, the currently obtained decoded bits are used by the error checking and correction circuit 208 to determine whether the decoding is successful. If the decoding is not successful, in the step S1608, the reading voltages may be re-obtained or the sign reading voltage may be reset by the memory management circuit 202, and the initial decoding values are re-obtained correspondingly and the second decoding procedure is re-executed. In the step S1609, whether the decoding is successful is determined by the error checking and correction circuit 208. If the decoding in the step S1609 is not successful, in the step S1610, whether a frequency of re-decoding exceeds a predetermined frequency. If the frequency of re-decoding already exceeds the predetermined frequency, then the decoding is showed to be failed (step S1611).

It is noted that the number of the reading voltage used in the step S1601 and the step S1603 are both one, and the first decoding procedures (including the iterative decoding of the hard bit mode) executed in the step S1601 and the step S1603 are both the same. Furthermore, the number of the reading voltage used in the step S16061 and the step S1608 are the same (and are greater than one), and the second decoding procedures (including the iterative decoding of the soft bit mode) executed in the step S1606 and the step S1608 are both the same.

Figure 17:
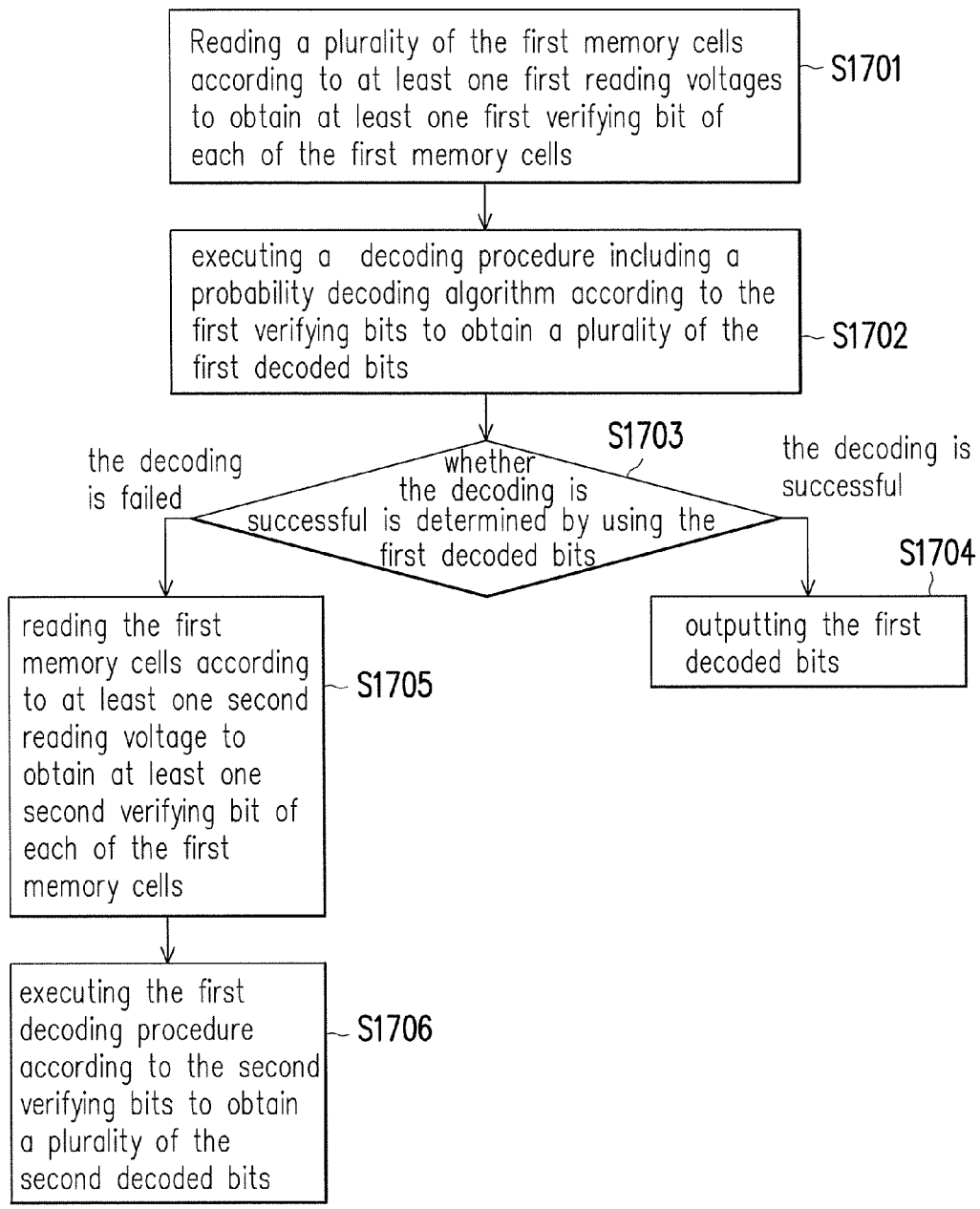
FIG. 17 is a flowchart illustrating a decoding method according to an exemplary embodiment.

FIG. 17 is a flowchart illustrating a decoding method according to an exemplary embodiment.

Referring to FIG. 17, in the step S1701, the plurality of the first memory cells are read according to at least one first reading voltage and at least one first verifying bit of each of the first memory cells is obtained. In the step S1702, a first decoding procedure including a probability decoding algorithm is executed according to the first verifying bits to obtain the plurality of the first decoded bits. In the step S1703, whether the decoding is successful is determined by using the first decoded bits.

If the decoding is successful, in the step S1704, the first decoded bits are outputted.

If the decoding is failed, in the step S1705, the first memory cells are read according to at least one second reading voltage to obtain at least one second verifying bit of each of the first memory cells. In the step S1706, the first decoding procedure is executed according to the second verifying bits to obtain a plurality of the second decoded bits.

It is noted that the first reading voltage in the step S1701 are different from the second reading voltage in the step S1705. However, the number of the first reading voltage and the number of the second reading voltage are the same. If either the number of the first reading voltage or the number of the second reading voltage is one, then the iterative decoding of the hard bit mode is included in the first decoding procedures in the step S1702 and the step S1706. If the number of the first reading voltages or the number of the second reading voltages are greater than one, then the iterative decoding of the soft bit mode is included in the first decoding procedures. The steps in FIG. 17 are detailed as the above and thus are not reiterated herein. It is noted that each of the steps in FIG. 17 may be implemented as the plurality of program codes or circuits. In addition, the method in FIG. 17 may be used with the above exemplary embodiments and may also be used alone, and the present invention is not limited thereto.

Based on the above, the decoding method, the memory storage device and the memory controlling circuit unit provided in the exemplary embodiment of the invention is to try to flip some bits in the codeword or to change the initial decoding values when the codeword has uncorrectable error bits. Accordingly, the codeword that is not decodable may possibly become decodable after being changed, and thereby the capability of error correction may be improved under the same code rate.

The previously described exemplary embodiments of the present invention have the advantages aforementioned, wherein the advantages aforementioned not required in all versions of the invention. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A decoding method for a rewritable non-volatile memory module, wherein the rewritable non-volatile memory module comprises a plurality of memory cells, the decoding method comprising:
   reading a plurality of first memory cells of the memory cells according to at least one first reading voltage to obtain at least one first verifying bit of each of the first memory cells;
   executing a first decoding procedure comprising a probability decoding algorithm according to the at least one first verifying bits of the first memory cells to obtain a plurality of first decoded bits, and determining whether a decoding is successful by using the first decoded bits; and
   if the decoding is failed, reading the first memory cells according to at least one second reading voltage to obtain at least one second verifying bit of each of the first memory cells, and executing the first decoding procedure according to the at least one second verifying bits of the first memory cells to obtain a plurality of second decoded bits,
   wherein the at least one second reading voltage is different from the at least one first reading voltage, and the number of the at least one second reading voltage is equal to the number of the at least one first reading voltage,
   wherein the first decoding procedure is an iterative decoding of a hard bit mode.

2. The decoding method of claim 1, further comprising:
   obtaining an offset value according to a difference between one of the at least one first reading voltage and a predetermined reading voltage; and
   using the offset value to adjust the predetermined reading voltage to obtain the at least one second reading voltage.

3. The decoding method of claim 2, wherein the number of the at least one first reading voltage is one, and the predetermined reading voltage is between the first reading voltage and the second reading voltage.

4. The decoding method of claim 2, wherein the step of obtaining the offset value comprises:
multiplying the difference between the one of the at least one first reading voltage and the predetermined reading voltage by a multiplier to obtain the offset value.

5. The decoding method of claim 1, further comprising:
determining whether the decoding is successful by using the second decoded bits;
if the decoding is determined failed by using the second decoded bits, determining whether a frequency of re-obtaining the at least one second reading voltage exceeds a predetermined frequency;
if the frequency of re-obtaining the at least one second reading voltage does not exceed the predetermined frequency, re-obtaining the at least one second reading voltage, reading the first memory cells according to the re-obtained at least one second reading voltage to re-obtain the at least one second verifying bits, and executing the first decoding procedure according to the re-obtained second verifying bits, and
if the frequency of re-obtaining the at least one second reading voltage exceeds the predetermined frequency, stop re-obtaining the at least one second reading voltage.

6. The decoding method of claim 5, wherein either the number of the at least one first reading voltage or the number of the at least one second reading voltage is one, and the decoding method further comprises:
if the frequency of re-obtaining the second reading voltages exceeds the predetermined frequency, reading the first memory cells according to a plurality of third reading voltages to obtain a plurality of third verifying bits of each of the first memory cells;
setting one of the third reading voltages as a first sign reading voltage;
obtaining an initial decoding value of each of the first memory cells according to the first sign reading voltage and the third verifying bits of each of the first memory cells;
executing a second decoding procedure on the initial decoding values to obtain a plurality of third decoded bits;
determining whether a decoding is successful by using the third decoded bits; and
if the decoding is determined failed by using the third decoded bits, setting another one of the third reading voltages as a second sign reading voltage, re-obtaining the initial decoding values according to the second sign reading voltage and the third verifying bits, and executing the second decoding procedure according to the re-obtained initial decoding values.

7. The decoding method of claim 6, wherein the first sign reading voltage is located in the middle part of the third reading voltages, the second sign reading voltage is located on one side of the first sign reading voltage, and the decoding method further comprises:
if the second decoding procedure executed by using the second sign reading voltage is not successful, setting still another one of the third reading voltages as a third sign reading voltage, re-obtaining the initial decoding values according to the third sign reading voltage and the third verifying bits, and executing the second decoding procedure according to the re-obtained initial decoding values,
wherein the third sign reading voltage is located on another side of the first sign reading voltage.

8. The decoding method of claim 6, further comprises:
providing the third verifying bits to different lookup tables to re-obtain the initial decoding values for different sign reading voltages.

9. The decoding method of claim 1, wherein the probability decoding algorithm is a low density parity code.

10. The decoding method of claim 1, wherein the step of determining whether the decoding is successful by using the first decoded bits comprises:
obtaining a plurality of syndromes according to the first decoded bits;
determining, according to the syndromes, whether the first decoded bits form a valid codeword; and
determining the decoding is successful if the first decoded bits form the valid codeword.

11. A memory storage device, comprising:
a connection interface unit configured to couple to a host system;
a rewritable non-volatile memory module which comprises a plurality of memory cells; and
a memory controlling circuit unit coupled to the connection interface unit and the rewritable non-volatile memory module, and configured to read a plurality of first memory cells of the memory cells according to at least one first reading voltage to obtain at least one first verifying bit of each of the first memory cells,
wherein the memory controlling circuit unit is configured to execute a first decoding procedure comprising a probability decoding algorithm according to the at least one first verifying bits of the first memory cells to obtain a plurality of first decoded bits, and determining whether a decoding is successful by using the first decoded bits,
if the decoding is failed, the memory controlling circuit unit is configured to read the first memory cells according to at least one second reading voltage to obtain at least one second verifying bit of each of the first memory cells, and to execute the first decoding procedure according to the at least one second verifying bits of the first memory cells to obtain a plurality of second decoded bits,
wherein the at least one second reading voltage is different from the at least one first reading voltage, and the number of the at least one second reading voltage is equal to the number of the at least one first reading voltage,
wherein the first decoding procedure is an iterative decoding of a hard bit mode.

12. The memory storage device of claim 11, wherein the memory controlling circuit unit is further configured to obtain an offset value according to a difference between one of the at least one first reading voltage and a predetermined reading voltage, and to use the offset value to adjust the predetermined reading voltage to obtain the at least one second reading voltage.

13. The memory storage device of claim 12, wherein the number of the at least one first reading voltage is one, and the predetermined reading voltage is between the first reading voltage and the second reading voltage.

14. The memory storage device of claim 12, wherein the operation that the memory controlling circuit unit obtains the offset value comprises:
the memory controlling circuit unit multiplies the difference between the one of the at least one first reading voltage and the predetermined reading voltage by a multiplier to obtain the offset value.

15. The memory storage device of claim 11, wherein the memory controlling circuit unit is further configured to determine whether the decoding is successful by using the second decoded bits,
- if the decoding is determined failed by using the second decoded bits, the memory controlling circuit unit is configured to determine whether a frequency of re-obtaining the at least one second reading voltage exceeds a predetermined frequency,
- if the frequency of re-obtaining the at least one second reading voltage does not exceed the predetermined frequency, the memory controlling circuit unit is configured to re-obtain the at least one second reading voltage, to read the first memory cells according to the re-obtained at least one second reading voltage to re-obtain the at least one second verifying bits, and to execute the first decoding procedure according to the re-obtained second verifying bits, and
- if the frequency of re-obtaining the at least one second reading voltage exceeds the predetermined frequency, the memory controlling circuit unit is configured to stop re-obtaining the at least one second reading voltage.

16. The memory storage device of claim 15, wherein either the number of the at least one first reading voltage or the number of the at least one second reading voltage is one,
- if the frequency of re-obtaining the second reading voltages exceeds the predetermined frequency, the memory controlling circuit unit is configured to read the first memory cells according to a plurality of third reading voltage to obtain a plurality of third verifying bits of each of the first memory cells,
- wherein the memory controlling circuit unit is further configured to set one of the third reading voltages as a first sign reading voltage and to obtain an initial decoding value of each of the first memory cells according to the first sign reading voltage and the third verifying bits of each of the first memory cells,
- wherein the memory controlling circuit unit is further configured to execute a second decoding procedure on the initial decoding values to obtain a plurality of third decoded bits and to determine whether a decoding is successful by using the third decoded bits, and
- if the decoding is determined failed by using the third decoded bits, the memory controlling circuit unit is configured to set another one of the third reading voltages as a second sign reading voltage, to re-obtain the initial decoding values according to the second sign reading voltage and the third verifying bits, and to execute the second decoding procedure according to the re-obtained initial decoding values.

17. The memory storage device of claim 16, wherein the first sign reading voltage is located in the middle part of the third reading voltages and the second sign reading voltage is located on one side of the first sign reading voltage,
- if the second decoding procedure executed by using the second sign reading voltage is not successful, the memory controlling circuit unit is configured to set still another one of the third reading voltages as a third sign reading voltage, to re-obtain the initial decoding values according to the third sign reading voltage and the third verifying bits, and to execute the second decoding procedure according to the re-obtained initial decoding values,
- wherein the third sign reading voltage is located on another side of the first sign reading voltage.

18. The memory storage device of claim 16, wherein the memory controlling circuit unit is further configured to provide the third verifying bits to different lookup tables to re-obtain the initial decoding values for different sign reading voltages.

19. The memory storage device of claim 11, wherein the probability decoding algorithm is a low density parity code.

20. The memory storage device of claim 11, wherein the operation that the memory controlling circuit unit determines whether the decoding is successful by using the first decoded bits comprises:
- the memory controlling circuit unit obtains a plurality of syndromes according to the first decoded bits and determines whether the first decoded bits form a valid codeword according to the syndromes; and
- if the first decoded bits form the valid codeword, the memory controlling circuit unit determines the decoding is successful.

21. A memory controlling circuit unit for controlling a rewritable non-volatile memory module, wherein the rewritable non-volatile memory module comprises a plurality of memory cells, the memory controlling circuit unit comprising:
- a host interface configured to couple to a host system;
- a memory interface configured to couple to the rewritable non-volatile memory module;
- an error checking and correction circuit; and
- a memory management circuit coupled to the host interface and the memory interface and configured to read a plurality of first memory cells of the memory cells according to at least one first reading voltage to obtain at least one first verifying bit of each of the first memory cells,
- wherein the error checking and correction circuit is configured to execute a first decoding procedure comprising a probability decoding algorithm according to the at least one first verifying bits of the first memory cells to obtain a plurality of first decoded bits, and determine whether a decoding is successful by using the first decoded bits,
- if the decoding is failed, the memory management circuit is configured to read the first memory cells according to at least one second reading voltage to obtain at least one second verifying bit of each of the first memory cells, and the error checking and correction circuit is configured to execute the first decoding procedure according to the at least one second verifying bits of the first memory cells to obtain a plurality of second decoded bits,
- wherein the at least one second reading voltage is different from the at least one first reading voltage, and the number of the at least one second reading voltage is equal to the number of the at least one first reading voltage,
- wherein the first decoding procedure is an iterative decoding of a hard bit mode.

22. The memory controlling circuit unit of claim 21, wherein the memory management circuit is further configured to obtain an offset value according to a difference between one of the at least one first reading voltage and a predetermined reading voltage, and to use the offset value to adjust the predetermined reading voltage to obtain the at least one second reading voltage.

23. The memory controlling circuit unit of claim 22, wherein the number of the at least one first reading voltage is one, and the predetermined reading voltage is between the first reading voltage and the second reading voltage.

24. The memory controlling circuit unit of claim 22, wherein the operation that the memory management circuit obtains the offset value comprises:

the memory management circuit multiplies the difference between the one of the at least one first reading voltage and the predetermined reading voltage by a multiplier to obtain the offset value.

25. The memory controlling circuit unit of claim 21, wherein the memory management circuit is further configured to determine whether the decoding is successful by using the second decoded bits,
- if the decoding is determined failed by using the second decoded bits, the memory management circuit is configured to determine whether a frequency of re-obtaining the at least one second reading voltage exceeds a predetermined frequency,
- if the frequency of re-obtaining the at least one second reading voltage does not exceed the predetermined frequency, the memory management circuit is configured to re-obtain the at least one second reading voltage and to read the first memory cells according to the re-obtained at least one second reading voltage to re-obtain the at least one second verifying bits,
- wherein the error checking and correction circuit is configured to execute the first decoding procedure according to the re-obtained second verifying bits, and
- if the frequency of re-obtaining the at least one second reading voltage exceeds the predetermined frequency, the memory management circuit is configured to stop re-obtaining the at least one second reading voltage.

26. The memory controlling circuit unit of claim 25, wherein either the number of the at least one first reading voltage or the number of the at least one second reading voltage is one,
- if the frequency of re-obtaining the second reading voltages exceeds the predetermined frequency, the memory management circuit is configured to read the first memory cells according to a plurality of third reading voltage to obtain a plurality of a third verifying bits of each of the first memory cells,
- wherein the memory management circuit is further configured to set one of the third reading voltages as a first sign reading voltage and to obtain an initial decoding value of each of the first memory cells according to the first sign reading voltage and the third verifying bits of each of the first memory cells,
- wherein the error checking and correction circuit is further configured to execute a second decoding procedure on the initial decoding values to obtain a plurality of third decoded bits and to determine whether the decoding is successful by using the third decoded bits, and
- if the decoding is determined failed by using the third decoded bits, the memory management circuit is configured to set another one of the third reading voltages as a second sign reading voltage and to re-obtain the initial decoding values according to the second sign reading voltage and the third verifying bits,
- wherein the error checking and correction circuit is configured to execute the second decoding procedure according to the re-obtained initial decoding values.

27. The memory controlling circuit unit of claim 26, wherein the first sign reading voltage is located in the middle part of the third reading voltages and the second sign reading voltage is located on one side of the first sign reading voltage,
- if the second decoding procedure executed by using the second sign reading voltage is not successful, the memory management circuit is configured to set still another one of the third reading voltages as a third sign reading voltage and to re-obtain the initial decoding values according to the third sign reading voltage and the third verifying bits,
- wherein the error checking and correction circuit is configured to execute the second decoding procedure according to the re-obtained initial decoding values,
- wherein the third sign reading voltage is located on another side of the first sign reading voltage.

28. The memory controlling circuit unit of claim 25, wherein the memory management circuit is further configured to provide the third verifying bits to different lookup tables to re-obtain the initial decoding values for different sign reading voltages.

29. The memory controlling circuit unit of claim 21, wherein the probability decoding algorithm is a low density parity code.

30. The memory controlling circuit unit of claim 21, wherein the operation that the error checking and correction circuit determines whether the decoding is successful by using the first decoded bits comprises:
- the error checking and correction circuit obtains a plurality of syndromes according to the first decoded bits and determines whether the first decoded bits form a valid codeword according to the syndromes; and
- if the first decoded bits form the valid codeword, the error checking and correction circuit determines the decoding is successful.

* * * * *